United States Patent
Bachmaier et al.

(10) Patent No.: US 12,458,338 B2
(45) Date of Patent: Nov. 4, 2025

(54) SURGICAL FIXATION SYSTEMS AND ASSOCIATED METHODS

(71) Applicant: ARTHREX, INC., Naples, FL (US)

(72) Inventors: Samuel Bachmaier, Mauern (DE); Jake Jolly, Naples, FL (US); Tara Swanlaw, Estero, FL (US); Colin Baker, Naples, FL (US); Tyler Esposito, Fort Myers, FL (US)

(73) Assignee: ARTHREX, INC., Naples, FL (US)

( * ) Notice: Subject to any disclaimer, the term of this patent is extended or adjusted under 35 U.S.C. 154(b) by 953 days.

(21) Appl. No.: 17/433,083

(22) PCT Filed: Mar. 4, 2020

(86) PCT No.: PCT/US2020/020952
§ 371 (c)(1),
(2) Date: Aug. 23, 2021

(87) PCT Pub. No.: WO2020/180963
PCT Pub. Date: Sep. 10, 2020

(65) Prior Publication Data
US 2022/0142635 A1    May 12, 2022

Related U.S. Application Data

(60) Provisional application No. 62/813,903, filed on Mar. 5, 2019, provisional application No. 62/813,904, filed on Mar. 5, 2019.

(51) Int. Cl.
*A61B 17/04* (2006.01)
(52) U.S. Cl.
CPC .. *A61B 17/0401* (2013.01); *A61B 2017/0404* (2013.01); *A61B 2017/0414* (2013.01); *A61B 2017/044* (2013.01)

(58) Field of Classification Search
CPC ........ A61B 17/0401; A61B 2017/0404; A61B 2017/0414; A61B 2017/044;
(Continued)

(56) References Cited

U.S. PATENT DOCUMENTS 5,699,657 A * 12/1997 Paulson ................. D07B 1/185
57/22
9,492,200 B2   11/2016 Sikora et al.
(Continued)

FOREIGN PATENT DOCUMENTS

EP        2455002 A1      5/2012
WO    2018/169961 A1      9/2018

OTHER PUBLICATIONS

International Search Report and Written Opinion for International application No. PCT/US2020/020952 dated Aug. 13, 2020.
(Continued)

*Primary Examiner* — Dianne Dornbusch
(74) *Attorney, Agent, or Firm* — Carlson, Gaskey & Olds, P.C.

(57) ABSTRACT

This disclosure relates to surgical fixation systems and methods. The surgical fixation systems of this disclosure may include various combinations of fixation devices, soft suture constructs, and/or adjustable loops and are configured for use in various knotless surgical methods, including but not limited to, syndesmosis, AC joint, UCL, bunion, anterior cruciate ligament (ACL), and posterior cruciate ligament (PCL) surgical methods.

18 Claims, 19 Drawing Sheets

(58) Field of Classification Search
CPC .... A61B 2017/0403; A61B 2017/0406; A61B 2017/0408
See application file for complete search history.

(56) References Cited

U.S. PATENT DOCUMENTS

| | | | |
|---|---|---|---|
| 9,700,291 B2* | 7/2017 | Norton | A61B 17/0218 |
| 2003/0236555 A1 | 12/2003 | Thornes | |
| 2008/0208252 A1 | 8/2008 | Holmes | |
| 2009/0182335 A1 | 7/2009 | Struhl | |
| 2010/0125297 A1 | 5/2010 | Guederian et al. | |
| 2010/0256677 A1 | 10/2010 | Albertorio et al. | |
| 2010/0268273 A1* | 10/2010 | Albertorio | A61B 17/0487 606/232 |
| 2012/0053630 A1* | 3/2012 | Denham | A61B 17/0401 606/232 |
| 2012/0065731 A1* | 3/2012 | Justin | A61F 2/0811 623/13.14 |
| 2012/0123474 A1* | 5/2012 | Zajac | A61B 17/842 606/232 |
| 2012/0123541 A1* | 5/2012 | Albertorio | A61B 17/0401 606/232 |
| 2013/0096612 A1* | 4/2013 | Zajac | A61B 17/0469 606/232 |
| 2014/0243893 A1* | 8/2014 | Santangelo | A61B 17/0401 606/232 |
| 2014/0277121 A1* | 9/2014 | Pilgeram | A61B 17/0469 57/22 |
| 2015/0039026 A1* | 2/2015 | Pasquali | A61B 17/06166 606/228 |
| 2015/0196385 A1* | 7/2015 | Kam | A61B 17/0401 623/13.14 |
| 2015/0201929 A1* | 7/2015 | Dooney, Jr. | A61B 17/80 606/232 |
| 2016/0157851 A1* | 6/2016 | Spenciner | A61F 2/0811 606/232 |
| 2017/0189007 A1* | 7/2017 | Burkhart | A61B 17/0401 |
| 2017/0273680 A1 | 9/2017 | Sengun et al. | |
| 2017/0281150 A1* | 10/2017 | Stecco | A61B 17/0401 |
| 2018/0221133 A1* | 8/2018 | Lund | A61B 17/0401 |
| 2019/0038276 A1* | 2/2019 | Jackson | A61F 2/0811 |

OTHER PUBLICATIONS

KISSloc™ Suture System Technique Guide, arthrosurface, eight pages.
International Preliminary Report on Patentability for International application No. PCT/US2020/020952 dated Sep. 16, 2021.
JP Application No. 2021-552777, Notice of Reasons for Rejection, mailed Oct. 23, 2023.
Australian Application No. 2020231508, Examination Report No. 1, dated Aug. 30, 2024.

* cited by examiner

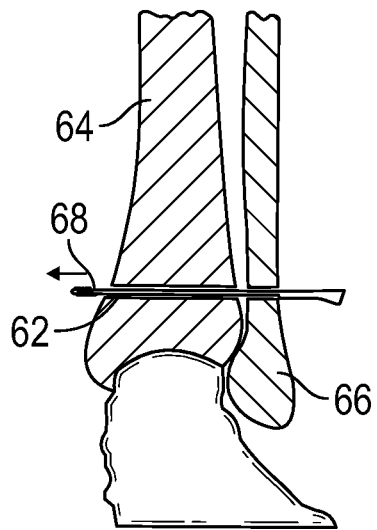
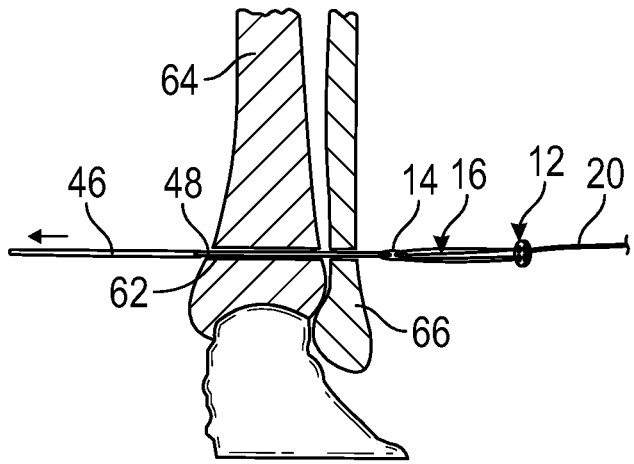
FIG. 10  FIG. 11
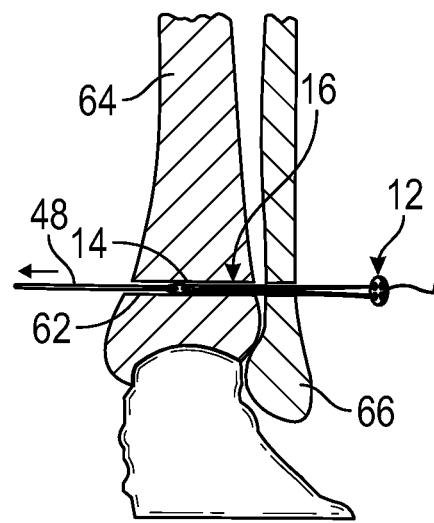
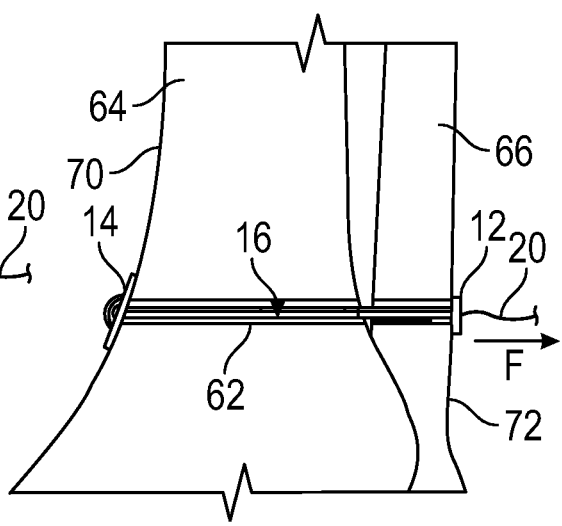
FIG. 12  FIG. 13

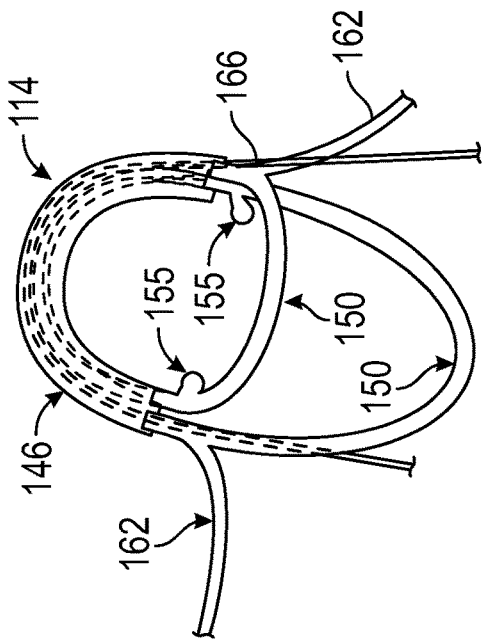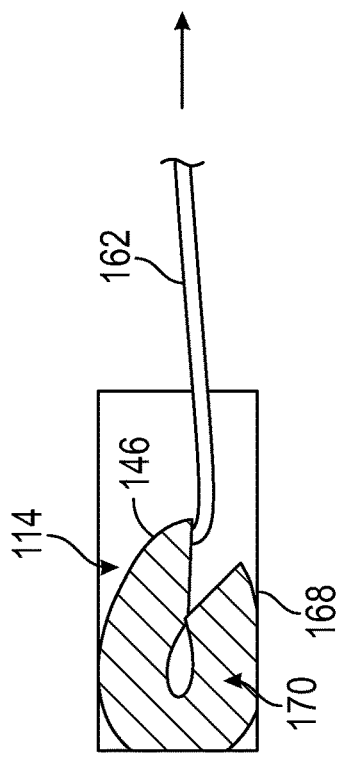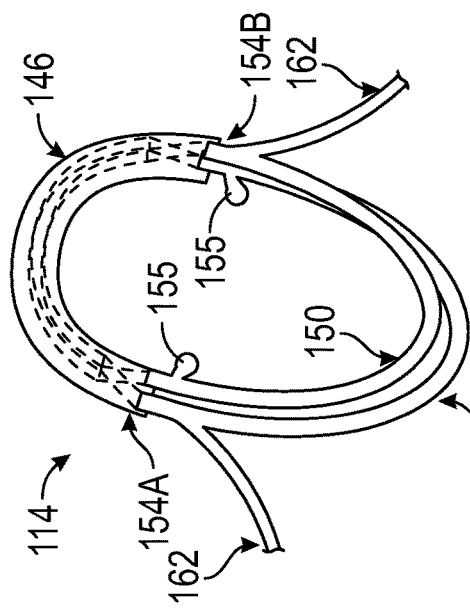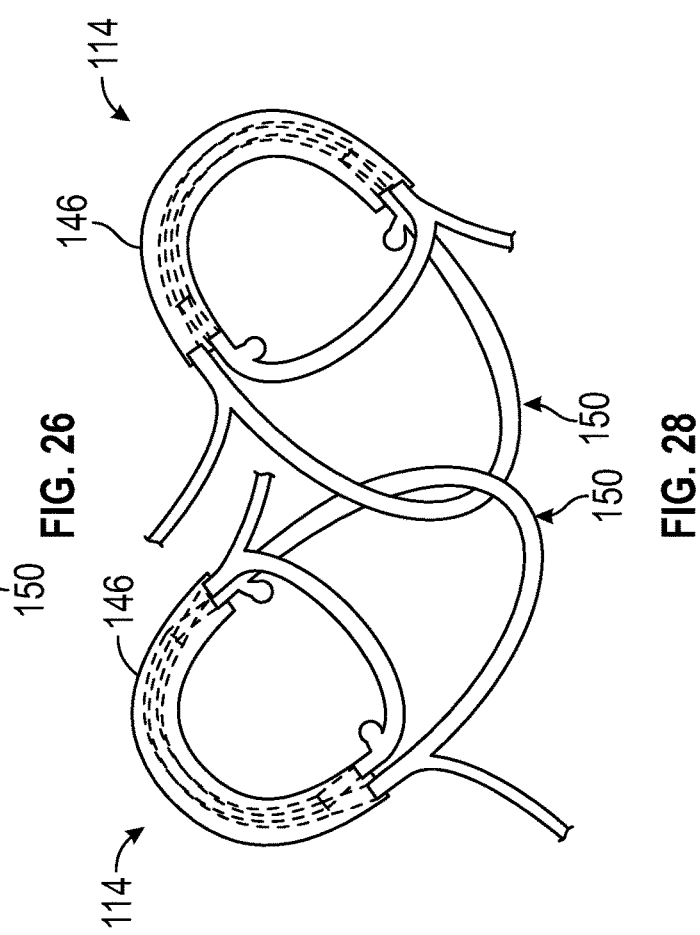
FIG. 26
FIG. 27
FIG. 28
FIG. 29

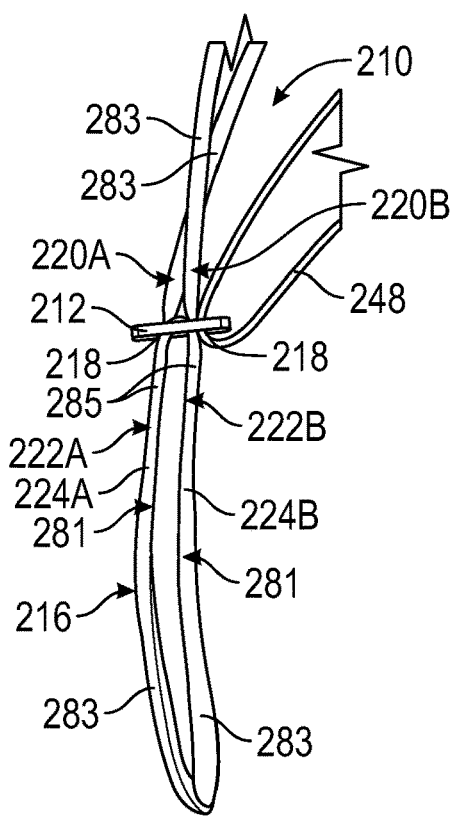
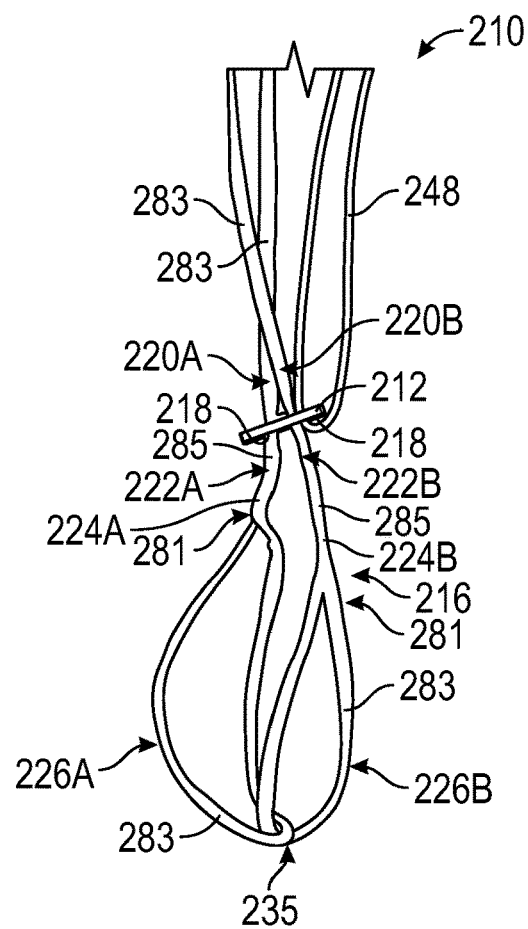
FIG. 38　　　　　　　FIG. 39
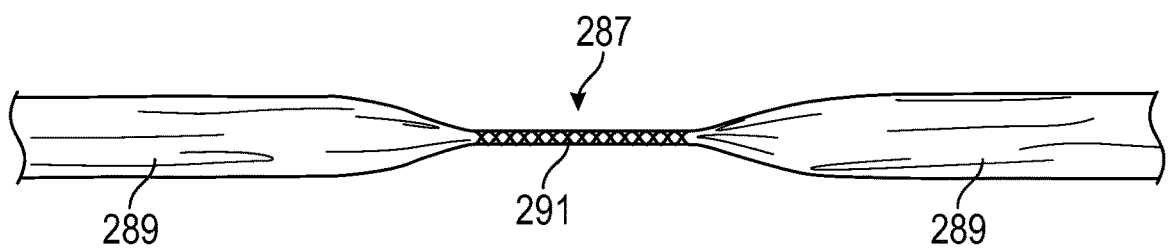
FIG. 40
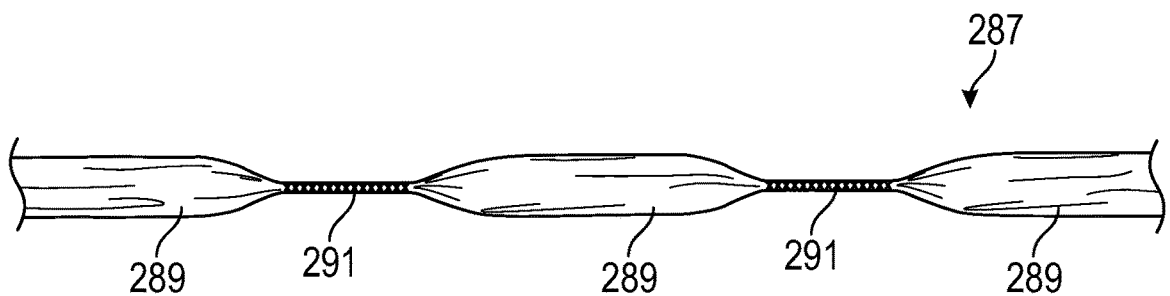
FIG. 41

SURGICAL FIXATION SYSTEMS AND ASSOCIATED METHODS

CROSS-REFERENCE TO RELATED APPLICATIONS

This is the national stage application of International Application No. PCT/US2020/020952, filed Mar. 4, 2020, which claims priority to U.S. Provisional Application No. 62/813,903, filed on Mar. 5, 2019, and claims priority to U.S. Provisional Application No. 62/813,904, filed on Mar. 5, 2019, the entire disclosures of which are incorporated herein by reference.

BACKGROUND

This disclosure relates to surgical fixation systems and methods for performing knotless surgical repairs and reconstructions.

Sutures and various fixation devices (e.g., buttons, anchors, etc.) are commonly used in the field of orthopedic surgery for performing joint stabilizations, tissue repairs, tissue reconstructions, fracture repairs, and other similar surgical methods. These types of surgical methods often involve fixating damaged tissue or realigning bones in order to restore the functionality of a joint.

SUMMARY

This disclosure relates to surgical fixation systems and methods. The surgical fixation systems may include one or more fixation devices and adjustable loops. The surgical fixation systems can be used in various knotless surgical methods, including but not limited to, syndesmosis, acromioclavicular (AC) joint, ulna collateral ligament (UCL), bunion, anterior cruciate ligament (ACL), and posterior cruciate ligament (PCL) surgical methods.

A surgical fixation system according to an exemplary aspect of this disclosure may include, inter alia, a first fixation device, and an adjustable loop connected to the first fixation device. A free braid strand is configured to adjust a size of the adjustable loop. A first locking mechanism is established by a spliced section of the adjustable loop, and a second locking mechanism that is independent from the first locking mechanism is established by a combination of features of the first fixation device and the adjustable loop.

A surgical method according to another exemplary aspect of this disclosure may include, inter alia, performing a syndesmosis reduction using a surgical fixation system. The surgical fixation system may include a first fixation device, and an adjustable loop connected to the first fixation device. A free braid strand is configured to adjust a size of the adjustable loop. A first locking mechanism is established by a spliced section of the adjustable loop, and a second locking mechanism that is independent from the first locking mechanism is established by a combination of features of the first fixation device and the adjustable loop.

A surgical fixation system according to another exemplary aspect of this disclosure may include, inter alia, a first fixation device, a first adjustable loop connected to the first fixation device, and a soft suture construct including a sheath and a second adjustable loop connected to the sheath. The first adjustable loop is a separate adjustable loop from the second adjustable loop. A first free braid strand is configured to adjust a size of the first adjustable loop, and a second free braid strand is configured to adjust a size of the second adjustable loop. A first locking mechanism is established by a first spliced section of the first adjustable loop, and a second locking mechanism is established by a second spliced section of the second adjustable loop.

A surgical method according to another exemplary aspect of this disclosure may include, inter alia, performing a syndesmosis reduction or an acromioclavicular reduction using a surgical fixation system. The surgical fixation system may include a first fixation device, a first adjustable loop connected to the first fixation device, and a soft suture construct including a sheath and a second adjustable loop connected to the sheath. The first adjustable loop is a separate adjustable loop from the second adjustable loop. A first free braid strand is configured to adjust a size of the first adjustable loop, and a second free braid strand is configured to adjust a size of the second adjustable loop. A first locking mechanism is established by a first spliced section of the first adjustable loop, and a second locking mechanism is established by a second spliced section of the second adjustable loop.

BRIEF DESCRIPTION OF THE DRAWINGS

FIGS. 10, 11, 12, and 13 schematically illustrate an exemplary surgical method that may employ the surgical fixation system of FIG. 1.

FIG. 26 illustrates yet another exemplary soft suture construct that can be used with the surgical fixation system of FIG. 16.

FIG. 27 illustrates yet another exemplary soft suture construct that can be used with the surgical fixation system of FIG. 16.

FIG. 28 illustrates yet another exemplary soft suture construct that can be used with the surgical fixation system of FIG. 16.

FIG. 29 illustrates a deployed state of a soft suture construct of a surgical fixation system.

FIG. 38 illustrates a surgical fixation system for performing knotless surgical methods according to yet another embodiment of this disclosure.

FIG. 39 illustrate an exemplary adjustable loop that can be used with the surgical fixation system of FIG. 38 or any other surgical fixation system described herein.

FIG. 40 illustrates an exemplary flexible strand that can be used to form the adjustable loop of FIG. 39 or any other adjustable loop described herein.

FIG. 41 illustrates another exemplary flexible strand that can be used to form the adjustable loop of FIG. 39 or any other adjustable loop described herein.

DETAILED DESCRIPTION

Figure 1:
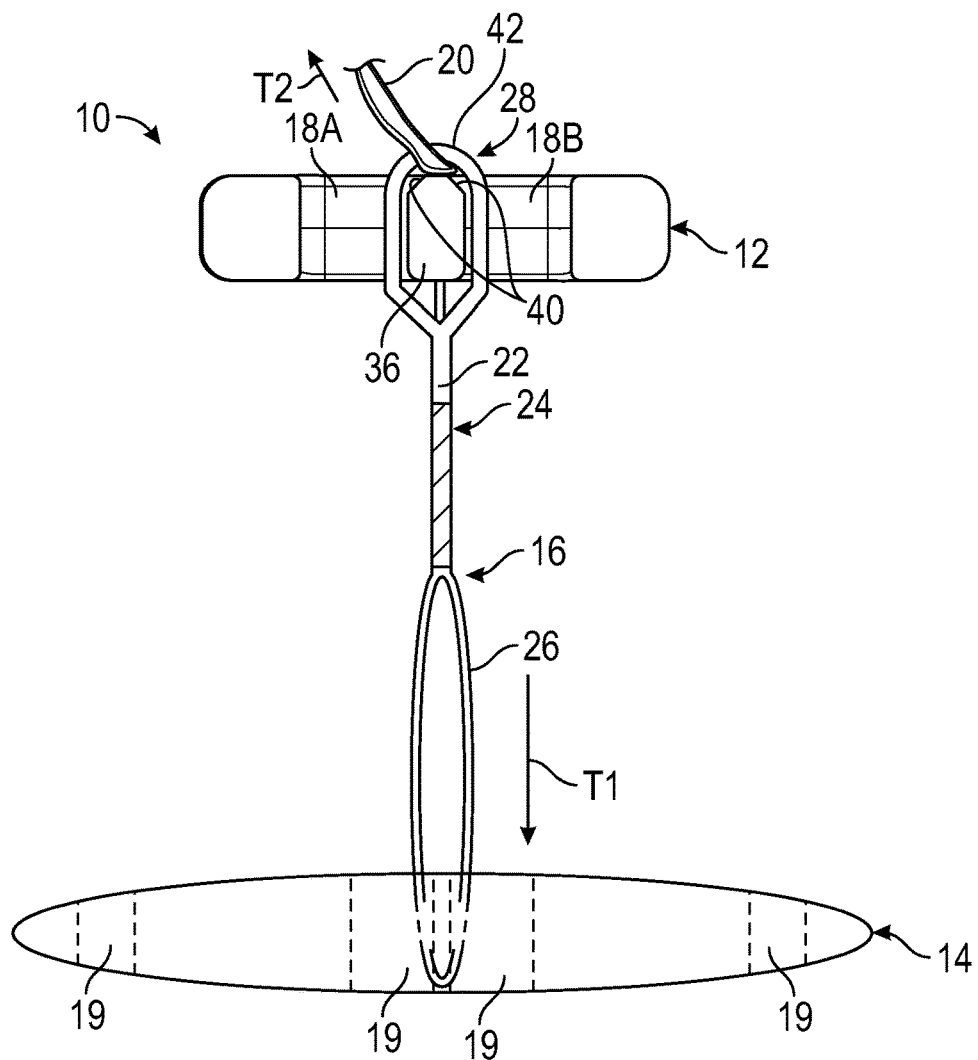
FIG. 1 illustrates a surgical fixation system for performing knotless surgical methods according to an embodiment of this disclosure.

This disclosure relates to surgical fixation systems and methods. The surgical fixation systems may include one or more fixation devices and adjustable loops and can be used in various knotless surgical methods, including but not limited to, syndesmosis, acromioclavicular (AC) joint, ulna collateral ligament (UCL), bunion, anterior cruciate ligament (ACL), and posterior cruciate ligament (PCL) surgical methods.

A surgical fixation system according to an exemplary aspect of this disclosure may include, inter alia, a first fixation device, and an adjustable loop connected to the first fixation device. A free braid strand is configured to adjust a size of the adjustable loop. A first locking mechanism is established by a spliced section of the adjustable loop, and a second locking mechanism that is independent from the first locking mechanism is established by a combination of features of the first fixation device and the adjustable loop.

In a further embodiment, a first fixation device of a surgical fixation system is a first button, and a second fixation device is connected to an adjustable loop of a surgical fixation system and is configured as a second button.

In a further embodiment, a first button of a surgical fixation system includes a first aperture, a second aperture, and a suture return aperture, and a free braid strand of an adjustable loop extends from a spliced section of the adjustable loop, through the suture return aperture, and then under a fixed loop section of the adjustable loop that rests over a bridge of the first button that is disposed between the first aperture and the second aperture to establish a second locking mechanism. In a locked position of the second locking mechanism, the free braid strand is tensioned against an outer surface of the bridge by the fixed loop section.

In a further embodiment, a first fixation device of a surgical fixation system is a button. A second fixation device of the surgical fixation system may be connected to an adjustable loop and is configured as a screw or a suture anchor.

In a further embodiment, a first locking mechanism of a surgical fixation system is a finger trap mechanism of an adjustable loop.

In a further embodiment, and adjustable loop of a surgical fixation system includes a spliced section, a free braid strand extending from the spliced section, a first locking mechanism, a single adjustable eyesplice loop extending in a first direction from the spliced section, and a single fixed loop section extending in a second direction from the spliced section.

In a further embodiment, a filament of a surgical fixation system is separate from an adjustable loop and extends between a fixed loop section of the adjustable loop and a fixation device. The filament is tensionable to move the fixed loop section, thereby releasing a free braid strand for adjusting the size of the adjustable loop.

In a further embodiment, an adjustable loop of a surgical fixation system includes a flat-to-round configuration.

A surgical fixation system according to another exemplary aspect of this disclosure may include, inter alia, a first fixation device, a first adjustable loop connected to the first fixation device, and a soft suture construct including a sheath and a second adjustable loop connected to the sheath. The first adjustable loop is a separate adjustable loop from the second adjustable loop. A first free braid strand is configured to adjust a size of the first adjustable loop, and a second free braid strand is configured to adjust a size of the second adjustable loop. A first locking mechanism is established by a first spliced section of the first adjustable loop, and a second locking mechanism is established by a second spliced section of the second adjustable loop.

In a further embodiment, a first fixation device of a surgical fixation system is a button. The button includes a first aperture, a second aperture, and a suture return aperture. A first free braid strand extends from the a spliced section of a first adjustable loop, through the suture return aperture, and then under a fixed loop section of the first adjustable loop that rests over a bridge of the button that is disposed between the first aperture and the second aperture. In a locked position, the first free braid strand is tensioned against an outer surface of the bridge by the fixed loop section. A second free braid strand extends from a second spliced section of a second adjustable loop, through a first locking mechanism of the first adjustable loop, through the suture return aperture, and then under the fixed loop section of the first adjustable loop.

In a further embodiment, a second free braid strand of a second adjustable loop of a surgical fixation system is spliced through a first spliced section of a first adjustable loop. A second locking mechanism and the second spliced section of the second adjustable loop are positioned at least partially within a bore of a sheath of a soft suture construct.

In a further embodiment, a first adjustable loop of a surgical fixation system passes through a sheath of a soft suture construct.

In a further embodiment, a sheath of a soft suture construct, a first adjustable loop, and a second adjustable loop of a surgical fixation system are each made exclusively of soft, suture based materials.

In a further embodiment, tensioning a second free braid strand of a surgical fixation system reduces the size of a second adjustable loop, thereby configuring a sheath of a soft suture construct into an anchoring cluster.

In a further embodiment, a first adjustable loop of a surgical fixation system includes a flat-to-round configuration.

FIG. 1 illustrates an exemplary surgical fixation system 10. The surgical fixation system 10 may be used to perform a variety of surgical methods. The surgical methods could include any procedure that involves repairing torn tissue or realigning bones, for example. The surgical fixation system 10 could be used in any surgical method related to the ankle, foot, hand, shoulder, or knee. Syndesmosis, AC joint, hallux valgus (i.e., bunion), and ulna collateral ligament (UCL) repairs are non-limiting examples of the types of surgical methods that could benefit from the surgical fixation systems 10 of this disclosure.

In an embodiment, the surgical fixation system 10 is used to perform "knotless" surgical methods. In this disclosure, the term "knotless" indicates that the surgical repair can be performed without requiring the surgeon to tie any knots in the various flexible materials or sutures that are utilized during the surgical method.

The surgical fixation system 10 may include, in this example, a first fixation device 12, a second fixation device 14, and an adjustable loop 16. The adjustable loop 16 may extend between and connect to each of the first fixation device 12 and the second fixation device 14.

The first fixation device 12 may provide cortical bone fixation relative to a first bone after the adjustable loop 16 of the surgical fixation system 10 has been positioned within a bone tunnel. In an embodiment, the first fixation device 12 is a button. However, fixation devices having various other configurations could alternatively be used. The first fixation device 12 may be oblong or round and may be made of either metallic or polymeric materials within the scope of this disclosure. An exemplary design of the first fixation device 12 is described in further detail below with reference to FIGS. 2 and 3.

Figure 1B:
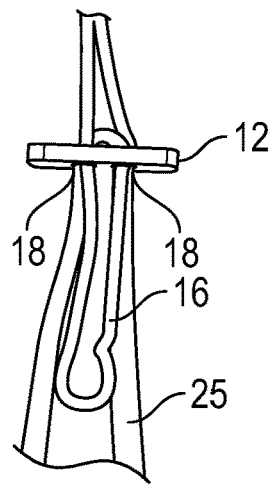
FIG. 1B illustrates another exemplary surgical fixation system.

In an embodiment, the first fixation device 12 includes one or more apertures 18 formed through a body of the first fixation device 12. The apertures 18 may be configured and arranged to receive the adjustable loop 16. Some of the apertures 18 could optionally carry one or more additional filaments for manipulating or maneuvering the first fixation device 12 or for augmenting fixation during a surgical method. For example, a suture tape 25 could be threaded through the apertures 18 and carried by the first fixation device 12 in addition to the adjustable loop 16 (see, e.g., FIG. 1B).

Figure 4:
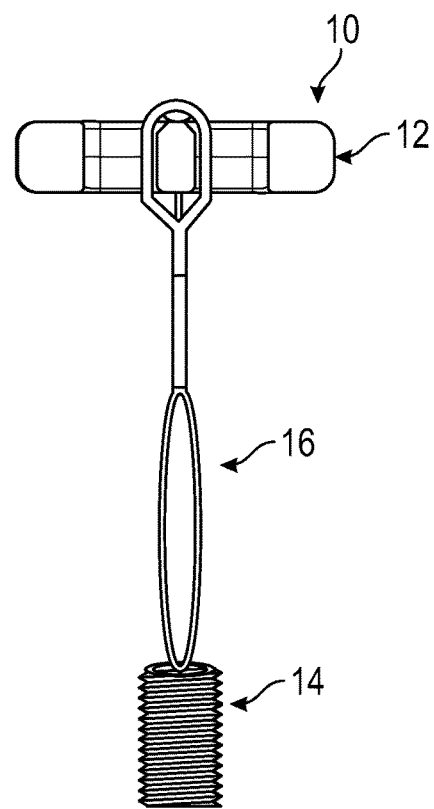
FIG. 4 illustrates a surgical fixation system according to a second embodiment of this disclosure.

The second fixation device 14 may provide either cortical or internal bone fixation relative to a second bone after the adjustable loop 16 of the surgical fixation system 10 has been positioned within a bone tunnel. In an embodiment, the second fixation device 14 is a button. In another embodiment, the second fixation device 14 is a screw or suture anchor (see FIG. 4). However, fixation devices having other similar configurations could alternatively or additionally be utilized. The second fixation device 14 may include any shape and may be made of either metallic or polymeric materials within the scope of this disclosure. In an embodiment, the second fixation device 14 is configured differently than the first fixation device 12.

In an embodiment, the second fixation device 14 includes one or more apertures 19 formed through a body of the second fixation device 14. The apertures 19 may be configured and arranged to receive the adjustable loop 16. Some of the apertures 19 could optionally carry one or more additional filaments for manipulating or maneuvering the second fixation device 14 during a surgical method, for example.

In an embodiment, the adjustable loop 16 is made of a flexible material, and in an example, includes an adjustable length and/or perimeter. The adjustable loop 16 includes a single free braid strand 20. The single free braid strand 20, which may also be referred to as a shortening strand, may be pulled to reduce the size of the adjustable loop 16. For example, the adjustable loop 16 may be adjusted in a first direction by pulling the single free braid stand 20 but is prevented from loosening in the opposite direction as a result of applied internal tensile forces.

In an embodiment, the single free braid strand 20 extends from a spliced section 22 of the adjustable loop 16. The spliced section 22 may include a first locking mechanism 24 (e.g., a finger trap mechanism) for preventing the unintentional loosening of the single free braid strand 20. The adjustable loop 16 may additionally include a single adjustable eyesplice loop 26, which may be formed by splicing the flexible material that is used to form the adjustable loop 16 through itself at the spliced section 22. In this embodiment, two strands extend from the spliced section 22 for forming the single adjustable eyesplice loop 26. The adjustable loop 16 of FIG. 1 is therefore considered a two-stranded loop. The two-stranded loop design minimizes the amount of bone that must be removed in order to accommodate the adjustable loop 16 within a bone tunnel.

The adjustable loop 16 may be connected to the first fixation device 12 and the second fixation device 14 prior to completely forming the adjustable loop 16. The single free braid strand 20 may be pulled to constrict the size of the single adjustable eyesplice loop 26 and thus may change the overall size of the adjustable loop 16.

Figure 2:
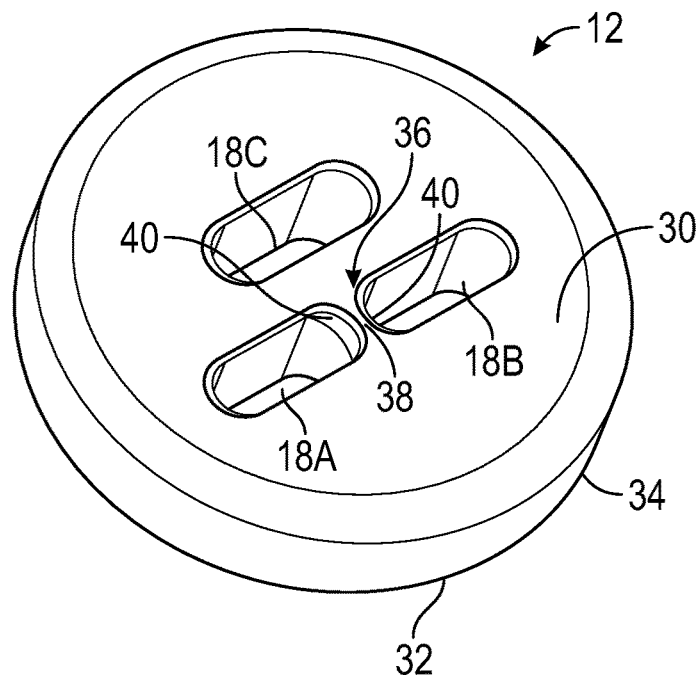
FIG. 2 is a perspective view of a first fixation device of the surgical fixation system of FIG. 1.
Figure 3:
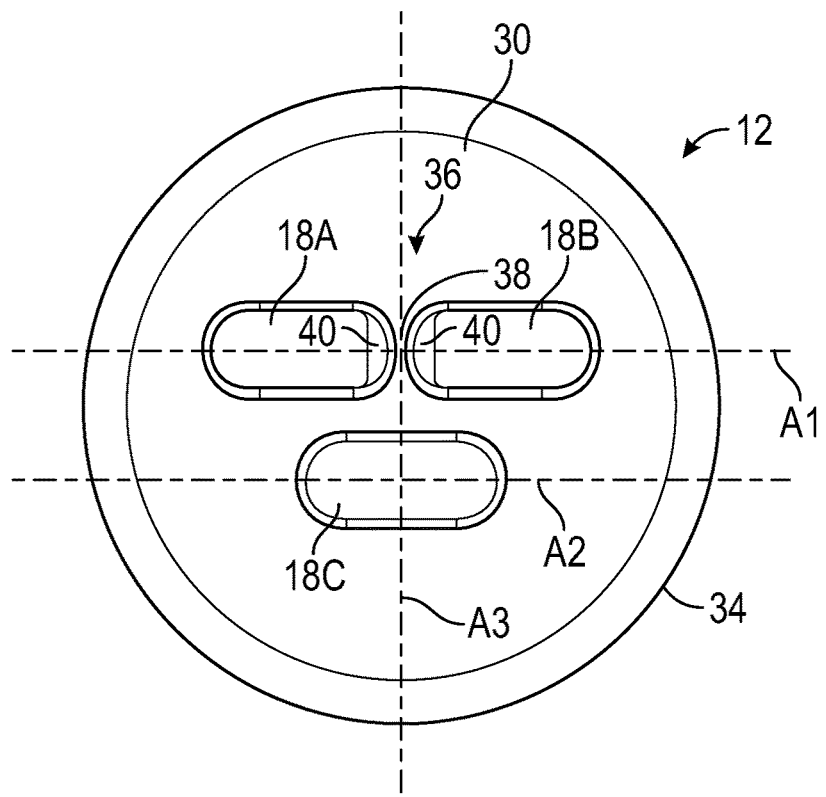
FIG. 3 is a top view of the first fixation device of FIG. 2.

Referring now to FIGS. 1-3, the adjustable loop 16 and the first fixation device 12 may cooperate to establish a second locking mechanism 28 of the surgical fixation system 10. The second locking mechanism 28, which is independent from the first locking mechanism 24, is adapted to lock the size and position of the adjustable loop 16 relative to the first fixation device 12, thereby increasing the strength of the surgical fixation system 10 at an interface between the adjustable loop 16 and the first fixation device 12. In an embodiment, the second locking mechanism 28 is a byproduct of a combination of features of the adjustable loop 16 and the first fixation device 12, whereas the first locking mechanism 24 is established solely by the adjustable loop 16.

The first fixation device 12 may include a top surface 30, a bottom surface 32, and a side wall 34 that extends between the top surface 30 and the bottom surface 32. Together, the top surface 30, the bottom surface 32, and the side wall 34 establish a body of the first fixation device 12. In the illustrated embodiment, the body of the fixation device 12 is round. However, in alternative embodiments, the body of the fixation device could include an oblong shape or various other shapes. The top surface 30 and the bottom surface 32 are substantially flat surfaces and the side wall 34 is a curved surface, in another embodiment.

A first aperture 18A, a second aperture 18B, and a third aperture 18C may be formed through the first fixation device 12 and may extend completely through both the top surface 30 and the bottom surface 32. The first aperture 18A and the second aperture 18B may be axially aligned with one another and may extend along a longitudinal axis A1, and the third aperture 18C may be offset to either side of the first and second apertures 18A, 18B and extend along a longitudinal axis A2. In an embodiment, the first aperture 18A, the second aperture 18B, and the third aperture 18C are oval shaped. However, the sizes and shapes of the apertures 18A-18C are not intended to limit this disclosure.

The first aperture 18A and the second aperture 18B may be configured and arranged to receive the adjustable loop 16 of the surgical fixation system 10. A bridge 36 may separate the first and second apertures 18A, 18B from one another for providing a surface for carrying the adjustable loop 16 of the surgical fixation system 10. The bridge 36 may include an outer surface 38 that is flush with the top surface 30 of the first fixation device 12 (i.e., the outer surface 38 is not countersunk relative to the top surface 30) and, for example, a pair of angled surfaces 40 that diverge in a direction toward the bottom surface 32 of the first fixation device 12. In an embodiment, the outer surface 38 of the bridge 36 extends along a longitudinal axis A3 that is, for example, generally perpendicular to the longitudinal axis A1 (see, e.g., FIG. 3).

The third aperture 18C may be utilized as a suture return aperture for receiving the single free braid strand 20 of the adjustable loop 16. The third aperture 18C may be located adjacent to the first and second apertures 18A, 18B. In an embodiment, the longitudinal axis A3 that extends through the outer surface 38 of the bridge 36 intersects the center of the third aperture 18C (see, e.g., FIG. 3).

The first fixation device 12 and the adjustable loop 16 may be configured to establish the second locking mechanism 28 of the surgical fixation system 10. In an embodiment, the single free braid strand 20 extends from the spliced section 22 of the adjustable loop 16 and is passed upwardly through, in this example, the third aperture 18C (i.e., in a direction that extends from the bottom surface 32 toward the top surface 30 of the first fixation device 12). The single free braid strand 20 may then be passed beneath a fixed loop section 42 (see FIG. 1) of the adjustable loop 16 that may, for example, rest over top of the bridge 36 (i.e., the single free braid strand 20 is passed between the fixed loop section 42 and the bridge 36) to establish the second locking mechanism 28.

In a locked position of the second locking mechanism 28, the single free braid strand 20 is held in tension directly against the outer surface 38 of the bridge 36 by the fixed loop section 42 of the adjustable loop 16. This tension may be created, for example, by applying a tensioning force T1 to any portion of the adjustable loop 16 that lies below the first fixation device 12. The single free braid strand 20 may therefore be held against the type of movement that is necessary for constricting the size of the single adjustable eyesplice loop 26 of the adjustable loop 16.

In an unlocked positon of the second locking mechanism 28, the tensioning force T1 that holds the fixed loop section 42 against the single free braid strand 20 is released, thereby permitting the single free braid strand 20 to slide between the bridge 36 and the fixed loop section 42. Once the tension being applied by the fixed loop section 42 has been removed, a tensioning force T2 may be applied to the single free braid strand 20 to constrict the size of the single adjustable eyesplice loop 26. The tension applied by the surgical fixation system 10 can therefore easily be adjusted by unlocking the second locking mechanism 28.

Figure 5:
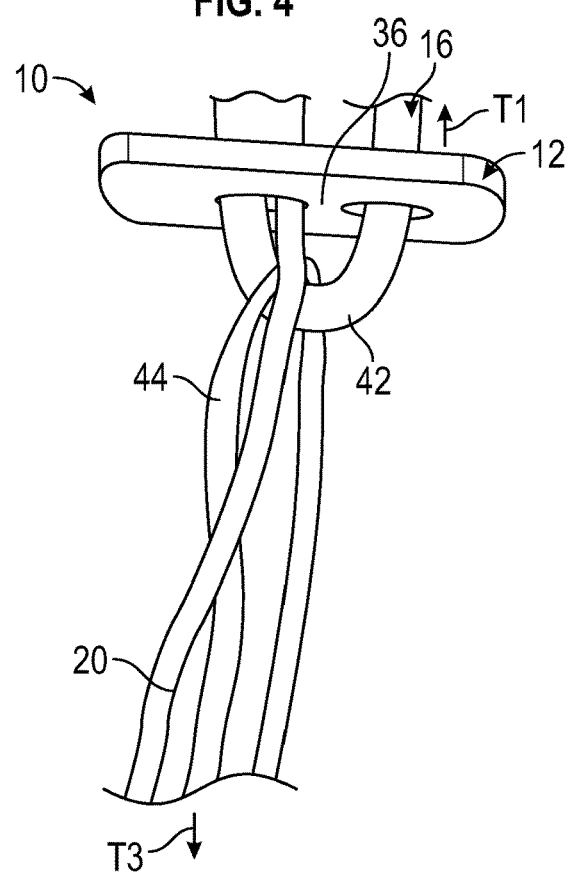
FIG. 5 illustrates additional features of the surgical fixation system of FIG. 1.

Referring now to FIG. 5, the surgical fixation system 10 may optionally include an additional filament 44 for allowing a user to more easily release the tensioning force T1 against the single free braid strand 20. The additional filament 44 is completely separate from the adjustable loop 16 and may be looped underneath the fixed loop section 42 so that a portion of the additional filament 44 is positioned axially between the fixed loop section 42 and the single free braid strand 20. A tensioning force T3 may be applied to the additional filament 44 in order to pull the fixed loop section 42 away from the bridge 36, thereby permitting the single free braid strand 20 to more easily slide between the bridge 36 and the fixed loop section 42.

As described above, the adjustable loop 16 of FIG. 1 includes a two-stranded configuration. However, other adjustable loop configurations are additionally contemplated within the scope of this disclosure.

Figure 6:
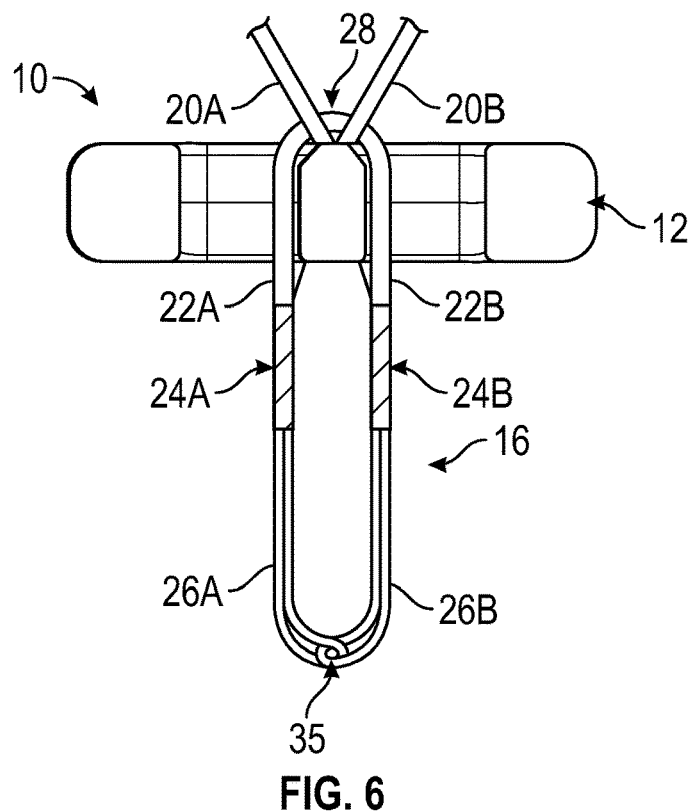
FIG. 6 illustrates an exemplary adjustable loop that can be used with the surgical fixation system of FIG. 1.

For example, the adjustable loop 16 of FIG. 6 may be made of a flexible material and may include a first free braid strand 20A and a second free braid strand 20B. The first and second free braid strands 20A, 20B may be pulled to reduce the size of the adjustable loop 16. In an embodiment, the first free braid strand 20A extends from a first spliced section 22A of the adjustable loop 16, and the second free braid strand 20B extends from a second spliced section 22B of the adjustable loop 16. The first spliced section 22A may include a first locking mechanism 24A and the second spliced section 22B may include a second locking mechanism 24B. The first and second locking mechanisms 24A, 24B prevent the unintentional loosening of the first and second free braid strands 20A, 20B. A third locking mechanism 28 may be established at an interface between the first fixation device 12 and the adjustable loop 16 in a similar manner as described above.

The adjustable loop 16 may additionally include two adjustable eyesplice loops 26A, 26B. The two adjustable eyesplice loops 26A, 26B may be interlinked at an interconnection 35. The two adjustable eyesplice loops 26A, 26B may be formed by splicing the flexible material forming the adjustable loop 16 through itself (i.e., through each of the spliced sections 22A, 22B). In this embodiment, two strands extend from each of the spliced sections 22A, 22B to form each of the adjustable eyesplice loops 26A, 26B. The adjustable loop 16 is therefore considered a four-stranded loop. The increased amount of strands of the adjustable loop 16 of FIG. 6 may increase the overall fixation strength that can be provided by the surgical fixation system 10.

Figure 7:
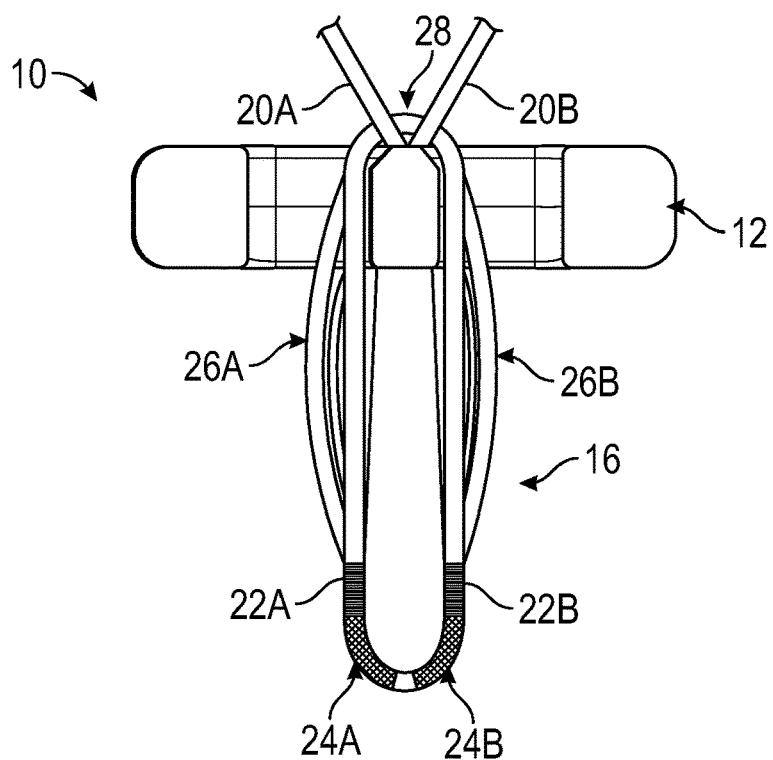
FIG. 7 illustrates another exemplary adjustable loop that can be used with the surgical fixation system of FIG. 1.

In yet another embodiment, shown in FIG. 7, the adjustable loop 16 may include a first free braid strand 20A and a second free braid strand 20B. The first and second free braid strands 20A, 20B may be pulled to reduce the size of the adjustable loop 16. In an embodiment, the first free braid strand 20A extends from a first spliced section 22A of the adjustable loop 16, and the second free braid strand 20B extends from a second spliced section 22B of the adjustable loop 16. The first and second spliced sections 22A, 22B are positioned at an opposite end of the adjustable loop 16 from the first fixation device 12, in this embodiment.

The first spliced section 22A may include a first locking mechanism 24A and the second spliced section 22B may include a second locking mechanism 24B. The first and second locking mechanisms 24A, 24B prevent the unintentional loosening of the first and second free braid strands 20A, 20B. A third locking mechanism 28 may be established at an interface between the first fixation device 12 and the adjustable loop 16 in a similar manner as described above.

The adjustable loop 16 of FIG. 7 may additionally include two adjustable eyesplice loops 26A, 26B. The two adjustable eyesplice loops 26A, 26B may be interlinked at an interconnection 35. The two adjustable eyesplice loops 26A, 26B may be formed by splicing the flexible material forming the adjustable loop 16 through itself (i.e., through each of the spliced sections 22A, 22B). In this embodiment, three strands extend from each of the spliced sections 22A, 22B to form each of the adjustable eyesplice loops 26A, 26B. The adjustable loop 16 is therefore considered a six-stranded loop. The increased amount of strands of the adjustable loop 16 of FIG. 7 may further increase the overall fixation strength that can be provided by the surgical fixation system 10.

Figure 8:
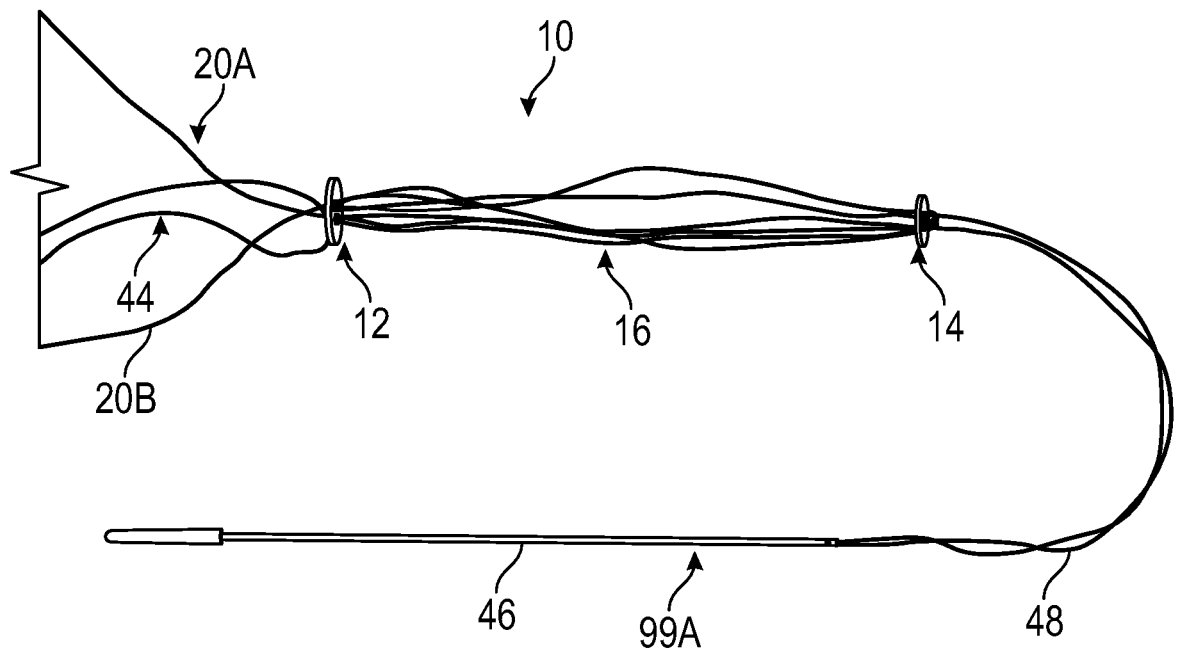
FIG. 8 illustrates an exemplary delivery device of a surgical fixation system.

The surgical fixation system 10 may additionally include one or more delivery devices for shuttling the adjustable loop 16 through one or more prepared bone tunnels. FIG. 8 illustrates a first delivery device 99A that can be utilized with the surgical fixation system 10. The first delivery device 99A may include a needle 46. The needle 46 may be connected to the second fixation device 14 of the surgical fixation system 10 by a passing filament 48. The needle 46 may be passed through a prepared bone tunnel or multiple bone tunnels to advance the second fixation device 14 through the bone tunnel(s).

Figure 9:
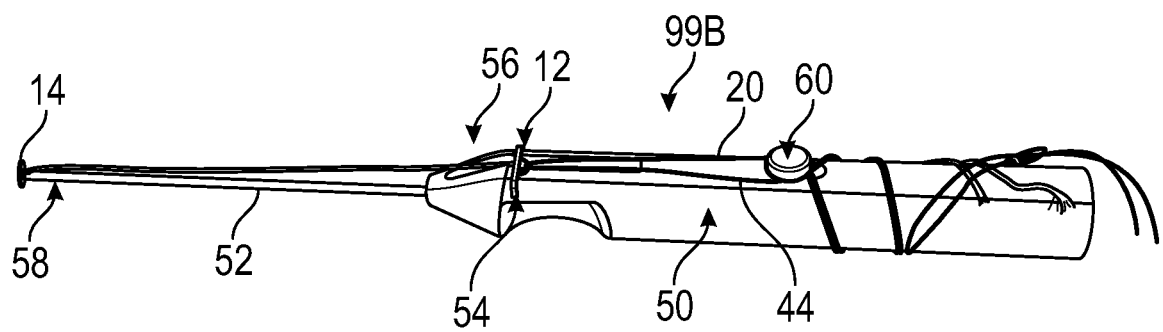
FIG. 9 illustrates another exemplary delivery device of a surgical fixation system.

A second delivery device 99B for use with the surgical fixation system 10 is illustrated in FIG. 9. The second delivery device 99B may include a handle 50 and a shaft 52 that extends from the handle 50. The first fixation device 12 of the surgical fixation system 10 may be releasably held within a slot 54 located near a distal end 56 of the handle 50. The second fixation device 14 of the surgical fixation system 10 may be releasably held at a distal end 58 of the shaft 52. The handle 50 may include a release mechanism 60 (e.g., a button) that is depressible for releasing the second fixation device 14 from the shaft 52. The free braid strand(s) 20 and the optional additional filament 44 may be wrapped around the release mechanism 60 for suture management. In use, the shaft 52 of the second delivery device 99B may be used to push the second fixation device 14 through prepared bone tunnels, such as when performing a syndesmosis repair method, for example.

FIGS. 10-13, with continued reference to FIGS. 1-9, schematically illustrate the surgical fixation system 10 being employed within an exemplary surgical method. In the illustrated embodiment, the surgical method is a syndesmosis repair method that involves a human ankle. Of course, the surgical fixation systems 10 of this disclosure could be employed in other surgical methods.

FIGS. 10-13 illustrate, in sequential order, an exemplary embodiment for performing a knotless surgical method. Fewer or additional steps than are recited below could be performed within the scope of this disclosure. In addition, the recited order of steps shown in FIGS. 10-13 is not intended to limit this disclosure.

Referring first to FIG. 10, a bone tunnel 62 may be formed through both a tibia 64 (e.g., a first bone) and a fibula 66 (e.g., a second bone). The bone tunnel 62 may be drilled through each of the tibia 64 and the fibula 66 using any suitable drill bit 68. In an embodiment, the bone tunnel 62 is formed through each of the tibia 64 and the fibula 66 using a single drill bit and in a single surgical step. The bone tunnel 62 may be drilled either medially to laterally or laterally to medially.

Next, as shown in FIGS. 11 and 12, the second fixation device 14 of the surgical fixation system 10 may be passed through the bone tunnel 62. In an embodiment, the needle 46 may be utilized as part of the surgical fixation system 10 for advancing the second fixation device 14 through the bone tunnel 62. Once the needle 46 is passed through both the fibula 66 and the tibia 64, the passing filament 48 may be further tensioned at a location laterally outward from the tibia 64 in order to shuttle the second fixation device 14 substantially horizontally through the bone tunnel 62 (see FIG. 12). In an alternative embodiment, the second fixation device 14 may be pushed horizontally through the bone tunnel 62 using the second delivery device 99B of FIG. 9.

Once the second fixation device 14 exits the bone tunnel 62, a slight counter traction force may be applied to the adjustable loop 16 for flipping or pivoting the second fixation device 14, thereby seating the second fixation device 14 against a medial cortex 70 of the tibia 64 (see FIG. 13). After seating the second fixation device 14 at the medial cortex 70, the first fixation device 12 may be tightened down against a lateral cortex 72 of the fibula 66 by applying a traction force F to the free braid strand 20 of the adjustable loop 16. The traction force F adjusts the size of the adjustable loop 16, thereby reducing the syndesmosis of the ankle joint without the need to tie any knots. The completed syndesmosis repair is shown in FIG. 13.

Figure 14:
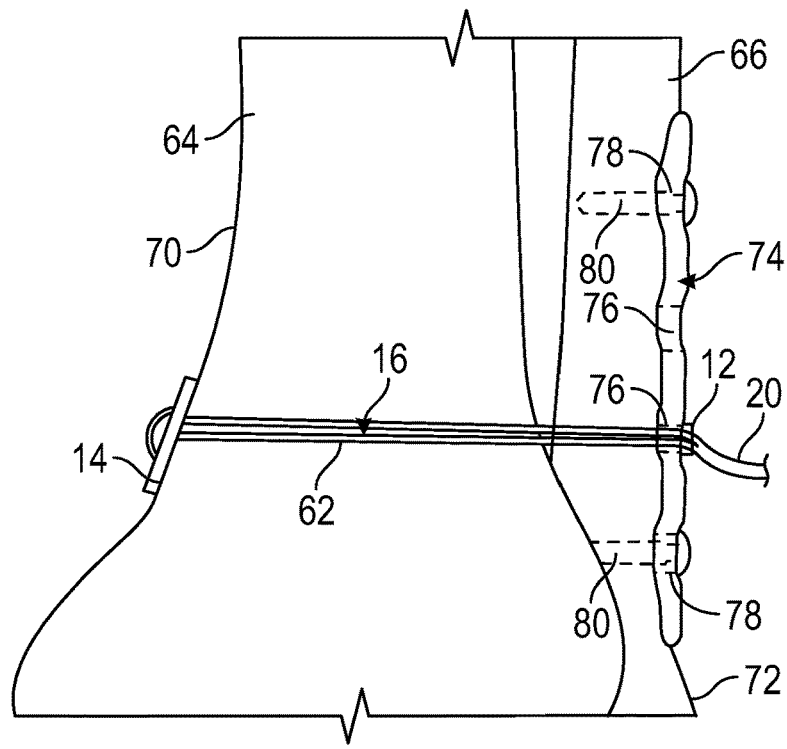
FIG. 14 schematically illustrates another exemplary surgical method.

Referring to FIG. 14, a bone plate 74 may be utilized as another component of the surgical fixation system 10 for performing the exemplary syndesmosis repair method. In an embodiment, the bone plate 74 is utilized for performing a syndesmosis reduction in association with a fracture fixation, such as when the fibula 66 is fractured.

The bone plate 74 may be contoured for receipt against the lateral cortex 72 of the fibula 66. The bone plate 74 may include at least one hole 76 for receiving the first fixation device 12 of the surgical fixation system and at least one hole 78 for accepting a threaded fastener 80. In an embodiment, the threaded fastener 80 is a non-locking screw configured to fixate the bone plate 74 to the fibula 66.

In another embodiment, the bone plate 74 includes at least two holes 76 and at least two holes 78. In such an embodiment, the holes 76 are located axially between the holes 78. The total number of holes 76, 78 formed through the bone plate 74 is not intended to limit this disclosure.

Figure 15:
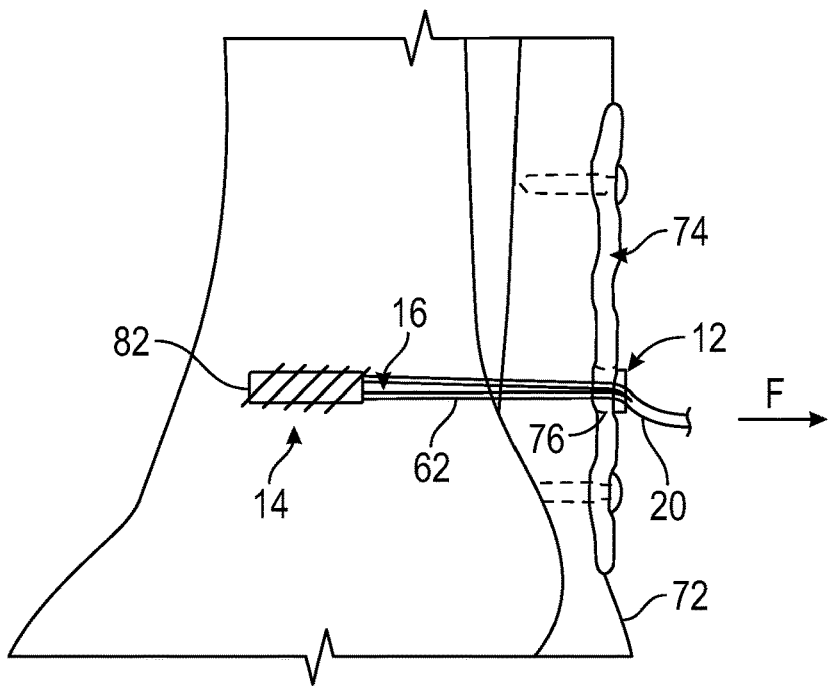
FIG. 15 schematically illustrates yet another exemplary surgical method.

FIG. 15 schematically illustrates another exemplary surgical method. In this embodiment, the surgical method is a tri-cortical syndesmosis repair method. The surgical fixation system 10 of FIG. 4 that includes a screw or suture anchor as the second fixation device 14 may be employed for performing the surgical method of FIG. 15.

The second fixation device 14 of the surgical fixation system 10 may be passed at least partially through a bone tunnel 62. In an embodiment, the bone tunnel 62 is formed through two cortices (i.e., both lateral and medial) of the fibula 66 but only through a single (i.e., lateral) cortex of the tibia 64. Thus, the bone tunnel 62 passes completely through the fibula 66 but only partially through the tibia 64.

In an embodiment, the second fixation device 14 may be pushed or screwed horizontally through the bone tunnel 62 using the second delivery device 99B of FIG. 9. The second fixation device 14 is inserted until seated near a floor 82 of the bone tunnel 62 at a location inside the tibia 64.

Once the second fixation device 14 is fully inserted into the bone tunnel 62, the first fixation device 12 may be tightened down against a lateral cortex 72 of the fibula 66 (or within a hole 76 of a bone plate 74) by applying a traction force F to the free braid strand 20 of the adjustable loop 16.

The traction force F adjusts the size of the adjustable loop 16, thereby reducing the syndesmosis of the ankle joint without the need to tie any knots.

Figure 16:
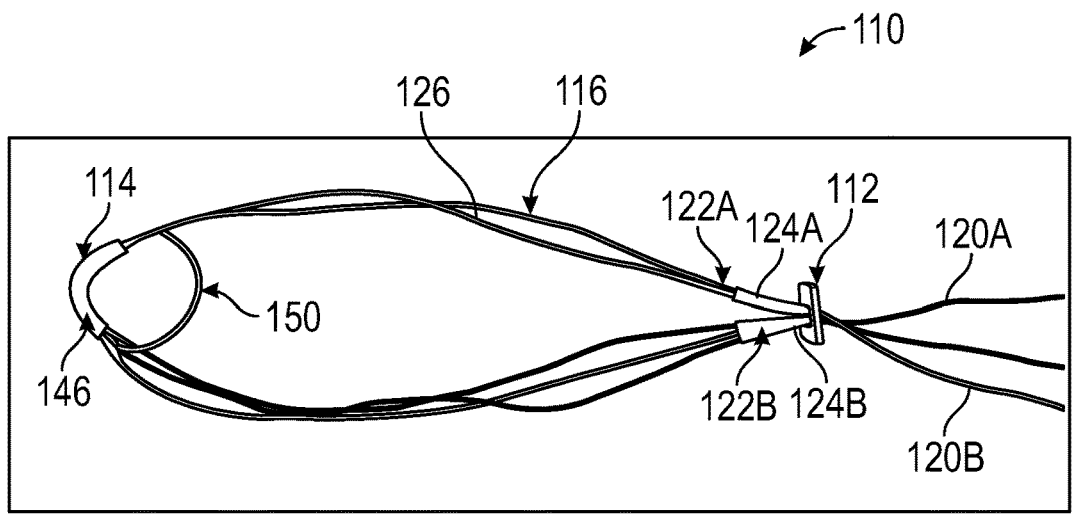
FIG. 16 illustrates a surgical fixation system for performing knotless surgical methods according to another embodiment of this disclosure.
Figure 17:
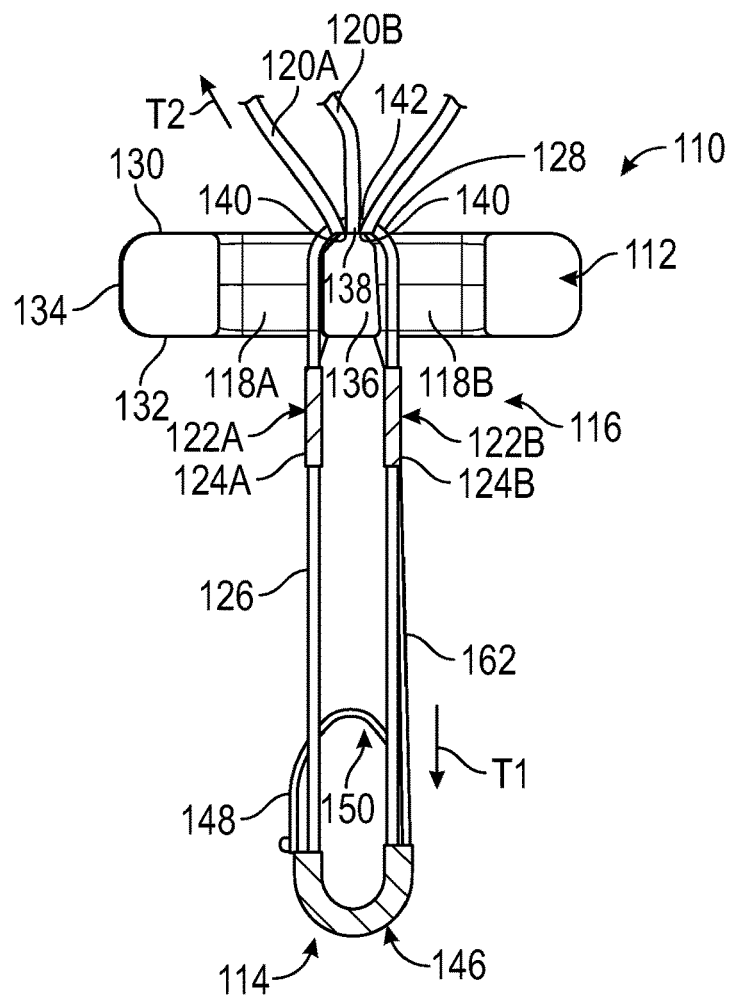
FIG. 17 is a cross-sectional view of the surgical fixation system of FIG. 16.

FIGS. 16 and 17 illustrate another exemplary surgical fixation system 110. The surgical fixation system 110 may be used to perform a variety of surgical methods. The surgical methods that may be performed using the surgical fixation system 110 could include any procedure that involves repairing torn tissue or realigning bones, for example. The surgical fixation system 110 could be used in any surgical method related to the ankle, foot, hand, shoulder, or knee. Syndesmosis, AC joint, hallux valgus (i.e., bunion), and ulna collateral ligament (UCL) repairs are non-limiting examples of the types of surgical methods that could benefit from the surgical fixation systems 110 of this disclosure.

In an embodiment, the surgical fixation system 110 is used to perform "knotless" surgical methods. The term "knotless" indicates that the surgical method can be performed and completed without requiring the surgeon to tie any knots in the various flexible materials or sutures that are utilized within the surgical fixation system 110.

The surgical fixation system 110 may include, in this example, a first fixation device 112, a soft suture construct 114 that acts as a second fixation device of the surgical fixation system 110, and an adjustable loop 116. The adjustable loop 116 may extend between and connect to each of the first fixation device 112 and the soft suture construct 114.

Figure 18:
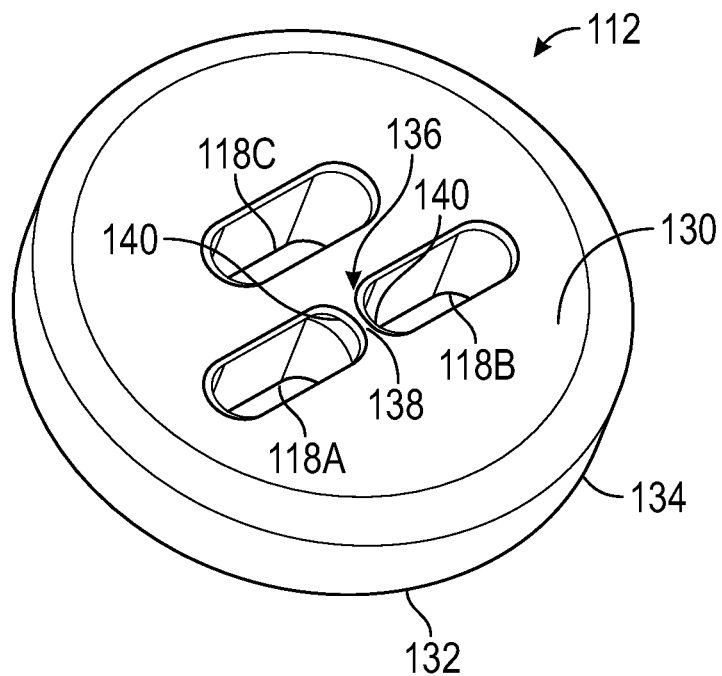
FIG. 18 is a perspective view of a first fixation device of the surgical fixation system of FIG. 16.
Figure 19:
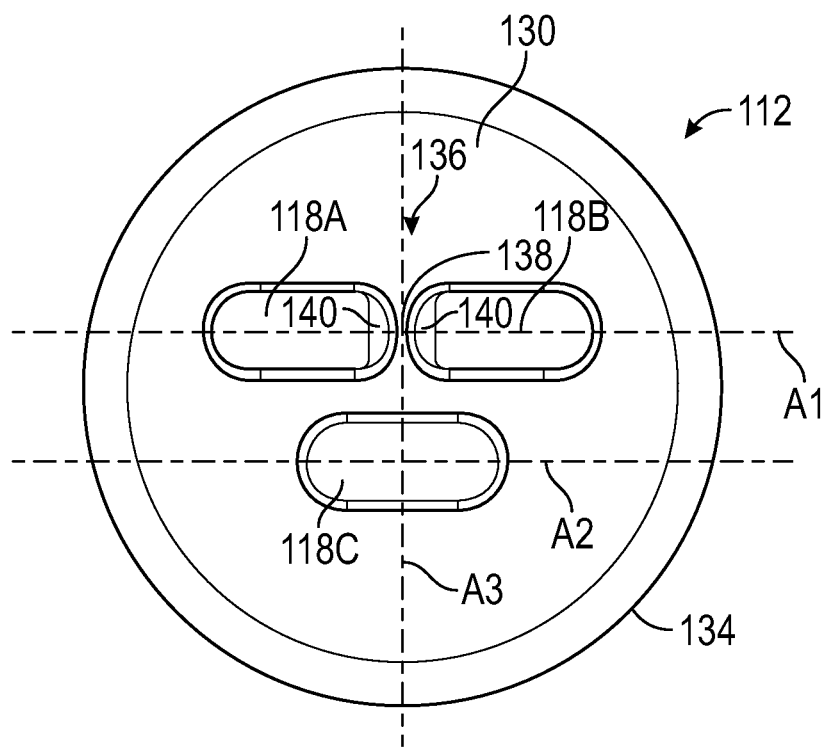
FIG. 19 is a top view of the first fixation device of FIG. 18.

The first fixation device 112 may provide cortical bone fixation relative to a first bone, and the soft suture construct 114 may provide internal bone fixation relative to a second bone after positioning the adjustable loop 116 of the surgical fixation system 110 within a bone tunnel. In an embodiment, the first fixation device 112 is a button. However, fixation devices having various other configurations could alternatively be used within the scope of this disclosure. The first fixation device 112 may be oblong or round and may be made of either metallic or polymeric materials within the scope of this disclosure. An exemplary design of the first fixation device 112 is described in further detail below with reference to FIGS. 18 and 19.

In an embodiment, the first fixation device 112 includes one or more apertures 118 formed through a body of the first fixation device 112. The apertures 118 may be configured and arranged to receive the adjustable loop 116. Some of the apertures 118 could optionally carry one or more additional filaments for manipulating or maneuvering the first fixation device 112 during a surgical method, for example.

In an embodiment, the adjustable loop 116 is made of a flexible material, and in an example, includes an adjustable length and/or perimeter. The adjustable loop 116 may include a first free braid strand 120A and a second free braid strand 120B. The first and second free braid strands 120A, 120B, which may also be referred to as shortening strands, may be pulled to reduce the size of the adjustable loop 116. For example, the adjustable loop 116 may be adjusted in a first direction by pulling the free braid stands 120A, 120B but is prevented from loosening in the opposite direction as a result of applied internal tensile forces.

In an embodiment, the first free braid strand 120A extends from a first spliced section 122A of the adjustable loop 116, and the second free braid strand 120B extends from a second spliced section 122B of the adjustable loop 116. The first spliced section 122A may include a first locking mechanism 124A (e.g., a first finger trap mechanism) and the second spliced section 122B may include a second locking mechanism 124B (e.g., a second finger trap mechanism). The first and second locking mechanisms 124A, 124B substantially prevent the unintentional loosening of the first and second free braid strands 120A, 120B. The adjustable loop 116 may additionally include a single adjustable eyesplice loop 126, which may be formed by splicing the flexible material that is used to form the adjustable loop 116 through itself at each of the spliced sections 122A, 122B. In this embodiment, a single strand extends from each of the spliced sections 122A, 122B for forming the single adjustable eyesplice loop 126. The adjustable loop 116 of FIG. 16 is therefore considered a two-stranded loop. The two-stranded loop design minimizes the amount of bone that must be removed in order to accommodate the adjustable loop 116 within a bone tunnel.

The adjustable loop 116 may be connected to the first fixation device 112 and to the soft suture construct 114 prior to completely forming the adjustable loop 116. The free braid strands 120A, 120B may be pulled to constrict the size of the single adjustable eyesplice loop 126 and thus change the overall size of the adjustable loop 116.

Referring now to FIGS. 16-19, the adjustable loop 116 and the first fixation device 112 may cooperate to establish a third locking mechanism 128 of the surgical fixation system 110. The third locking mechanism 128, which is independent from the first and second locking mechanisms 124A, 124B, is adapted to lock the size and position of the adjustable loop 116 relative to the first fixation device 112, thereby increasing the strength of the surgical fixation system 110 at an interface between the adjustable loop 116 and the first fixation device 112. In an embodiment, the third locking mechanism 128 is a byproduct of a combination of features of the adjustable loop 116 and the first fixation device 112, whereas the first and second locking mechanisms 124A, 124B are established solely by the adjustable loop 116.

The first fixation device 112 may include a top surface 130, a bottom surface 132, and a side wall 134 that extends between the top surface 130 and the bottom surface 132. Together, the top surface 130, the bottom surface 132, and the side wall 134 establish a body of the first fixation device 112. In the illustrated embodiment, the body of the fixation device 112 is round. However, in alternative embodiments, the body of the fixation device could include an oblong shape or various other shapes. The top surface 130 and the bottom surface 132 are substantially flat surfaces and the side wall 134 is a curved surface, in another embodiment.

A first aperture 118A, a second aperture 118B, and a third aperture 118C may be formed through the first fixation device 112 and may extend completely through both the top surface 130 and the bottom surface 132. The first aperture 118A and the second aperture 118B may be axially aligned with one another and may extend along a longitudinal axis A1, and the third aperture 118C may be offset to either side of the first and second apertures 118A, 118B and extend along a longitudinal axis A2. In an embodiment, the first aperture 118A, the second aperture 118B, and the third aperture 118C are oval shaped. However, the sizes and shapes of the apertures 118A-118C are not intended to limit this disclosure.

The first aperture 118A and the second aperture 118B may be configured and arranged to receive the adjustable loop 116 of the surgical fixation system 110. A bridge 136 may separate the first and second apertures 118A, 118B from one another for providing a surface for carrying the adjustable loop 116 of the surgical fixation system 110. The bridge 136 may include an outer surface 138 that is flush with the top surface 130 of the first fixation device 112 (i.e., the outer surface 138 is not countersunk relative to the top surface 130) and, for example, a pair of angled surfaces 140 that diverge in a direction toward the bottom surface 132 of the first fixation device 112. In an embodiment, the outer surface 138 of the bridge 136 extends along a longitudinal axis A3 that is, for example, generally perpendicular to the longitudinal axis A1 (see, e.g., FIG. 18).

The third aperture 118C may be utilized as a suture return aperture for receiving the first and second free braid strands 120A, 120B of the adjustable loop 116. The third aperture 118C may be located adjacent to the first and second apertures 118A, 118B. In an embodiment, the longitudinal axis A3 that extends through the outer surface 138 of the bridge 136 intersects the center of the third aperture 118C (see, e.g., FIG. 18).

The first fixation device 112 and the adjustable loop 116 may be configured to establish the third locking mechanism 128 of the surgical fixation system 110. In an embodiment, the free braid strands 120A, 120B extend from the spliced sections 122A, 122B of the adjustable loop 116 and are passed upwardly through, in this example, the third aperture 118C (i.e., in a direction that extends from the bottom surface 132 toward the top surface 130 of the first fixation device 112). The free braid strands 120A, 120b may then be passed beneath a fixed loop section 142 (see FIG. 17) of the adjustable loop 116 that may, for example, rest over top of the bridge 136 (i.e., the free braid strands 120 are passed between the fixed loop section 142 and the bridge 136) to establish the third locking mechanism 128.

In a locked position of the third locking mechanism 128, the free braid strands 120A, 120B are held in tension directly against the outer surface 138 of the bridge 136 by the fixed loop section 142 of the adjustable loop 116. This tension may be created, for example, by applying a tensioning force T1 to any portion of the adjustable loop 116 that lies below the first fixation device 112. The free braid strands 120A, 120B may therefore be held against the type of movement that is necessary for constricting the size of the single adjustable eyesplice loop 126 of the adjustable loop 116.

In an unlocked positon of the third locking mechanism 128, the tensioning force T1 that holds the fixed loop section 142 against the free braid strands 120A, 120B is released, thereby permitting the free braid strands 120A, 120B to slide between the bridge 136 and the fixed loop section 142. Once the tension being applied by the fixed loop section 142 has been removed, a tensioning force T2 may be applied to the free braid strands 120A, 120B to constrict the size of the single adjustable eyesplice loop 126. The tension applied by the surgical fixation system 110 can therefore easily be adjusted by unlocking the third locking mechanism 128.

As described above, the adjustable loop 116 of FIG. 116 includes a two-stranded configuration. However, other adjustable loop configurations are additionally contemplated within the scope of this disclosure.

Figure 20:
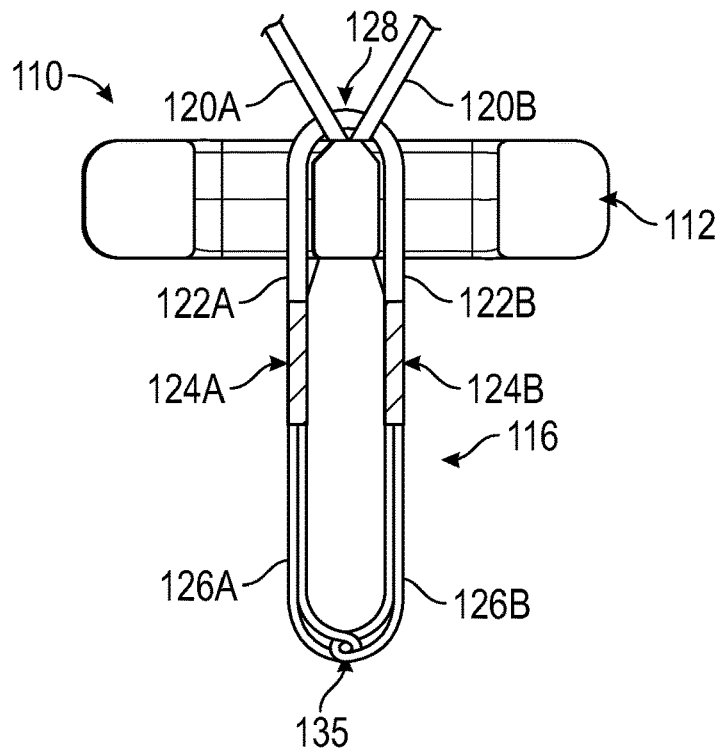
FIG. 20 illustrates an exemplary adjustable loop that can be used with the surgical fixation system of FIG. 16.

For example, the adjustable loop 116 of FIG. 20 may be made of a flexible material and may include a first free braid strand 120A and a second free braid strand 120B. The first and second free braid strands 120A, 120B may be pulled to reduce the size of the adjustable loop 116. In an embodiment, the first free braid strand 120A extends from a first spliced section 122A of the adjustable loop 116, and the second free braid strand 120B extends from a second spliced section 122B of the adjustable loop 116. The first spliced section 122A may include a first locking mechanism 124A and the second spliced section 122B may include a second locking mechanism 124B. The first and second locking mechanisms 124A, 124B prevent the unintentional loosening of the first and second free braid strands 120A, 120B. A third locking mechanism 128 may be established at an interface between the first fixation device 112 and the adjustable loop 116 in a similar manner as described above.

The adjustable loop 116 may additionally include two adjustable eyesplice loops 126A, 126B. The two adjustable eyesplice loops 126A, 126B may be interlinked at an interconnection 135. The two adjustable eyesplice loops 126A, 126B may be formed by splicing the flexible material forming the adjustable loop 116 through itself (i.e., through each of the spliced sections 122A, 122B). In this embodiment, two strands extend from each of the spliced sections 122A, 122B to form each of the adjustable eyesplice loops 126A, 126B. The adjustable loop 116 is therefore considered a four-stranded loop. The increased amount of strands of the adjustable loop 116 of FIG. 20 may increase the overall fixation strength that can be provided by the surgical fixation system 110.

Figure 21:
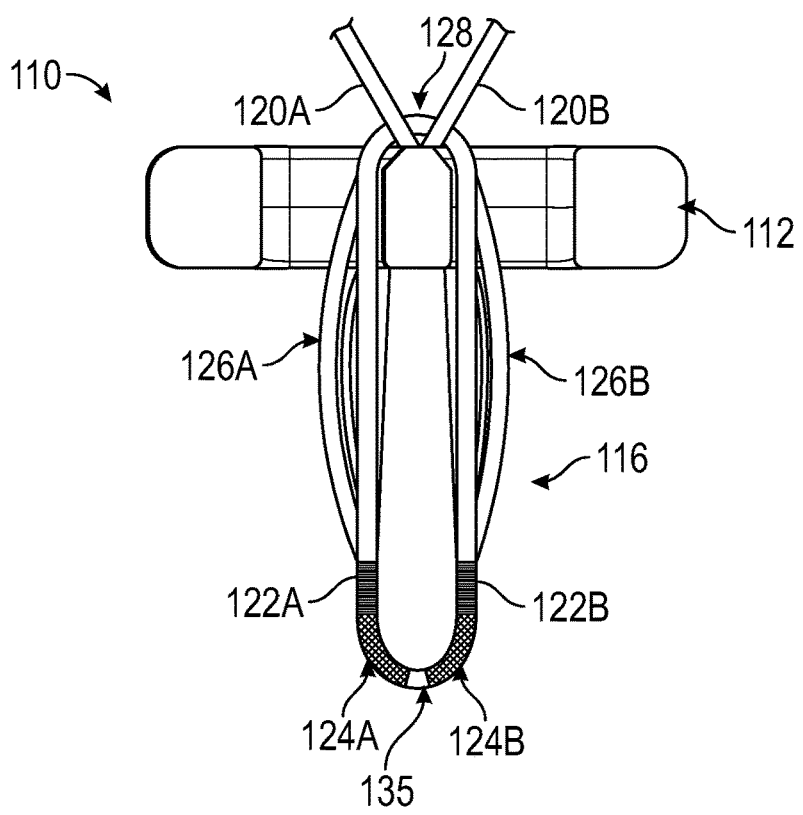
FIG. 21 illustrates another exemplary adjustable loop that can be used with the surgical fixation system of FIG. 16.

In yet another embodiment, shown in FIG. 21, the adjustable loop 116 may include a first free braid strand 120A and a second free braid strand 120B. The first and second free braid strands 120A, 120B may be pulled to reduce the size of the adjustable loop 116. In an embodiment, the first free braid strand 120A extends from a first spliced section 122A of the adjustable loop 116, and the second free braid strand 120B extends from a second spliced section 122B of the adjustable loop 116. The first and second spliced sections 122A, 122B are positioned at an opposite end of the adjustable loop 116 from the first fixation device 112, in this embodiment.

The first spliced section 122A may include a first locking mechanism 124A and the second spliced section 122B may include a second locking mechanism 124B. The first and second locking mechanisms 124A, 124B prevent the unintentional loosening of the first and second free braid strands 120A, 120B. A third locking mechanism 128 may be established at an interface between the first fixation device 112 and the adjustable loop 116 in a similar manner as described above.

The adjustable loop 116 of FIG. 21 may additionally include two adjustable eyesplice loops 126A, 126B. The two adjustable eyesplice loops 126A, 126B may be interlinked at an interconnection 135. The two adjustable eyesplice loops 126A, 126B may be formed by splicing the flexible material forming the adjustable loop 116 through itself (i.e., through each of the spliced sections 122A, 122B). In this embodiment, three strands extend from each of the spliced sections 122A, 122B to form each of the adjustable eyesplice loops 126A, 126B. The adjustable loop 116 is therefore considered a six-stranded loop. The increased amount of strands of the adjustable loop 116 of FIG. 21 may further increase the overall fixation strength that can be provided by the surgical fixation system 110.

Figure 22:
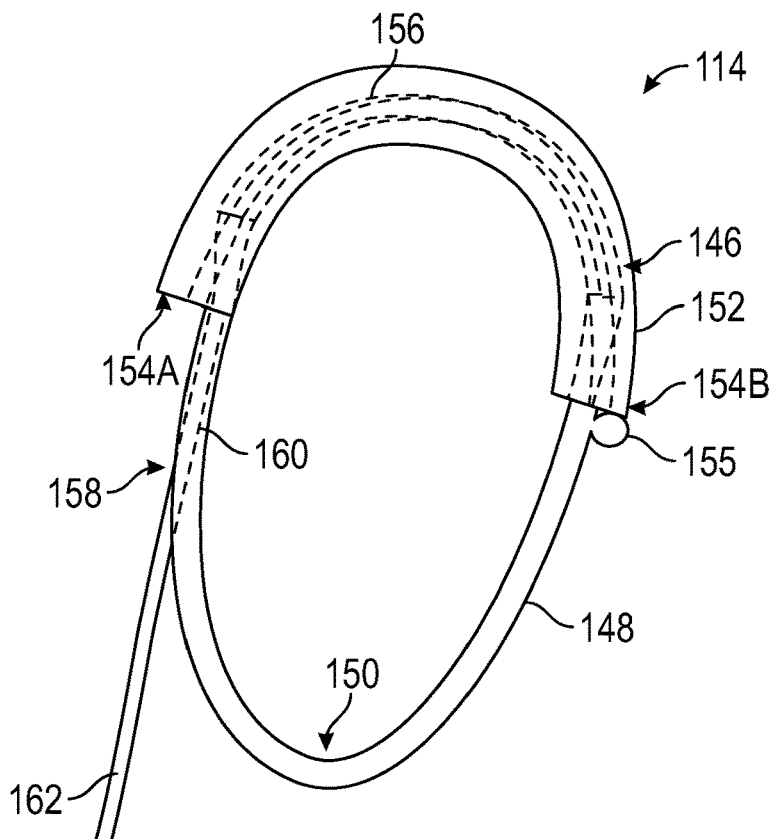
FIG. 22 illustrates an exemplary soft suture construct of the surgical fixation system of FIG. 16.

Referring now to FIGS. 16-17 and 22, the soft suture construct 114 of the surgical fixation system 110 may include a sheath 146 and one or more flexible strands 148 that may be threaded through the sheath 146 to form an adjustable loop 150. In this embodiment, the adjustable loop 150 of the soft suture construct 114 is a completely separate loop from the adjustable loop 116 of the surgical fixation system 110. Stated another way, the adjustable loop 116 and the adjustable loop 150 are made from separate and distinct filaments, in this embodiment. However, other embodiments are also contemplated in which the adjustable loop 116 and the adjustable loop 150 are made from the same filament (see, e.g., the embodiment of FIG. 24).

The sheath 146 may include a tubular body 152 that extends between opposing ends 154A, 154B. The opposing ends 154A, 154B may be open ends. The tubular body 152 establishes a bore 156 that extends between the opposing ends 154A, 154B. The bore 156 may be configured to accommodate portions of both the adjustable loop 116 and the adjustable loop 150.

In an embodiment, the sheath 146 is a tubular sleeve made of a flexible material, such as a braided, woven, or knitted structure made of yarns, fibers, filaments, sutures, or other similar materials, or combinations of these materials. In another embodiment, the sheath 146 is constructed of polyester suture material. However, other flexible materials may also be suitable for constructing the sheath 146.

In another embodiment, the flexible strand 148 that is used to form the adjustable loop 150 is a filament, such as a suture. Non-limiting examples of suitable sutures include FiberWire®, TigerWire®, or FiberChain® suture, which are each available from Arthrex, Inc., although any type of suture may be utilized, including cored or coreless sutures. In another embodiment, the flexible strand 148 is flat suture, such as FiberTape® or SutureTape®, which are also available from Arthrex, Inc. The flexible strand 148 could include any soft, flexible strand of material.

The flexible strand 148 may be threaded through the bore 156 in one or more passes to configure the flexible strand 148 into the adjustable loop 150. In an embodiment, the flexible strand 148 may exit the tubular body 152 through the opposing ends 154A, 154B of the sheath 146. In another embodiment, the flexible strand 148 may be spliced through wall portions of the sheath 146 at locations that are spaced from the opposing ends 154A, 154B.

The adjustable loop 150 may be held in position relative to the sheath 146 by forming a fixed suture portion 155 (e.g., a knot) in the flexible strand 148. In an embodiment, the fixed suture portion 155 is formed in an end of the flexible strand 148. Although the fixed suture portion 155 may take the form of a knot in an example, the surgical fixation system 110 is still considered to provide "knotless" fixation because the surgeon is not required to form the knot during the surgical method. The fixed suture portion 155 may instead be formed during the manufacturing process.

The flexible strand 148 may be spliced through itself at one or more spliced sections 158 to form the adjustable loop 150. Each spliced section 158 may include a locking mechanism 160 (e.g., another finger trap mechanism) that may establish a fourth locking mechanism of the surgical fixation system 110. In an embodiment, the spliced section 158 may be positioned at least partially inside the bore 156 of the sheath 146. A free braid strand 162 may extend from the spliced section 158 and may be tensioned to constrict the size of the adjustable loop 150.

Tensioning the free braid strand 162 may additionally assist in deploying the sheath 146 for achieving internal bone fixation after the soft suture construct 114 has been inserted into a bone tunnel. For example, tensioning the free braid strand 162 may cause the sheath 146 to bunch up and thus, collapse, expand, and/or change shape to fixate the soft suture construct 114 inside a bone tunnel.

In another embodiment, the free braid stand 162 of the adjustable loop 150 may optionally be transferred through one of the locking mechanisms 124A, 124B of the adjustable loop 116, such as by splicing the free braid strand 162 through one of the spliced sections 122A, 122B of the adjustable loop 116 (see FIG. 17). This additional splicing may improve the fixation strength and overall mechanical stabilization potential of the soft suture construct 114. After being transferred through the locking mechanism 124A or 124B, the free braid strand 162 may be passed upwardly through, in this example, the third aperture 118C of the first fixation device 112 and then beneath the fixed loop section 142 of the adjustable loop 116. The free braid strand 162 of the adjustable loop 150 of the soft suture construct 114 may therefore be linked to the third locking mechanism 128 for releasably holding the free braid strand 162 in tension against the type of movement that is necessary for constricting the size of the adjustable loop 150.

The soft suture construct 114 depicted in FIGS. 16-17 and 22 is one exemplary construct for use within the surgical fixation system 110. However, other soft suture construct configurations are additionally contemplated within the scope of this disclosure.

Figure 23:
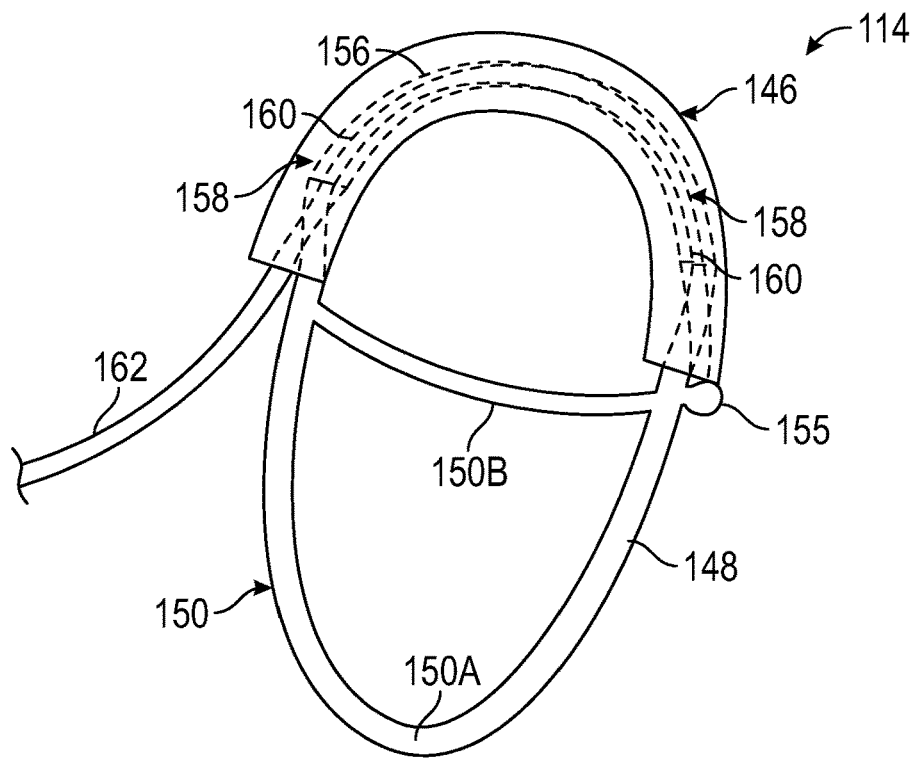
FIG. 23 illustrates another exemplary soft suture construct that can be used with the surgical fixation system of FIG. 16.

For example, the soft suture construct 114 of FIG. 23 may include a sheath 146 and a flexible strand 148 threaded through the sheath 146 to form an adjustable loop 150 that includes both a first adjustable loop portion 150A and a second adjustable loop portion 150B. Although two adjustable loop portions are shown in FIG. 23, the flexible strand 148 could be passed through the bore 156 for forming any amount of adjustable loop portions within the adjustable loop 150. The flexible strand 148 may be passed through a bore 156 of the sheath 146 multiple times in order to form the first and second adjustable loop portions 150A, 150B.

In an embodiment, the second adjustable loop portion 150B includes a shorter initial loop length than the first adjustable loop portion 150A. The adjustable loop portions 150A, 150B may be held in position relative to the sheath 146 by forming a fixed suture portion 155 (e.g., a knot) in the flexible strand 148.

The flexible strand 148 may be spliced through itself at one or more spliced sections 158 to form the first and second adjustable loop portions 150A, 150B. The spliced sections 158 may each include a locking mechanism 160 (e.g., a finger trap mechanism) that may be incorporated to establish additional locking mechanisms (e.g., fourth, fifth, etc.) of the surgical fixation system 110. A single free braid strand 162 may extend from the spliced sections 158 and may be tensioned to reduce the size of the first and second adjustable loop portions 150A, 150B.

Tensioning the free braid strand 162 may additionally deploy the sheath 146 for achieving internal bone fixation after the soft suture construct 114 has been inserted into a bone tunnel. For example, tensioning the free braid strand 162 may adjust the size of each of the adjustable loop portions 150A, 150B, thereby causing the sheath 146 to bunch up and thus, collapse, expand, and/or change shape to fixate the soft suture construct 114 inside a bone tunnel. Providing more than one adjustable loop portion within the adjustable loop 150 may assist in more easily deploying the sheath 146 for achieving improved internal bone fixation.

Figure 24:
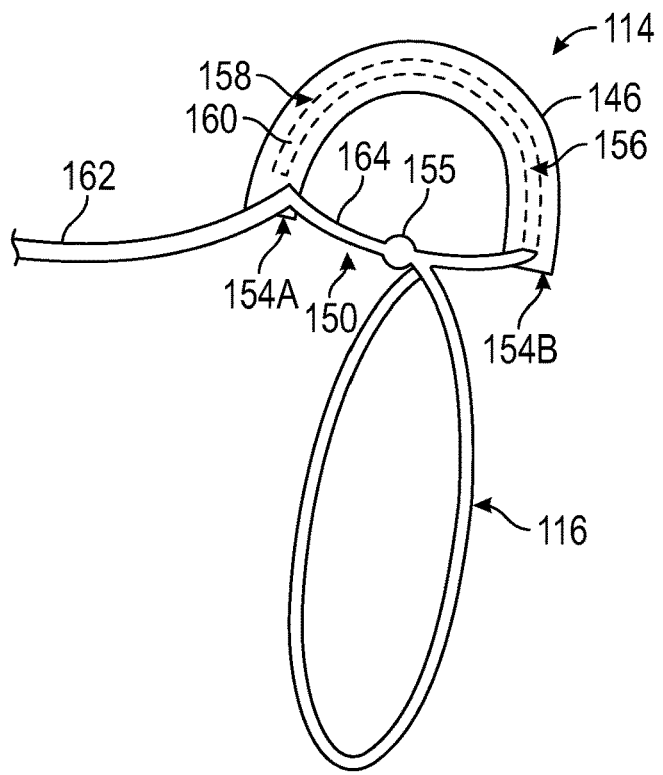
FIG. 24 illustrates another exemplary soft suture construct that can be used with the surgical fixation system of FIG. 16.

FIG. 24 illustrates another exemplary soft suture construct 114 that may be employed as part of the surgical fixation system 110. Like the constructs described above, the soft suture construct 114 of FIG. 24 may include a sheath 146 and an adjustable loop 150. In this embodiment, however, the adjustable loop 150 is part of and is established by the same flexible material that forms the adjustable loop 116. For example, prior to completely forming the adjustable loop 116, the flexible material of the adjustable loop 116 may be passed through the bore 156 of the sheath 146 in a manner that forms the adjustable loop 150.

The adjustable loop 150 may include a bridging strand 164 that bridges a distance between the opposing ends 154A, 154B of the sheath 146. The adjustable loop 150 may be held in position relative to the sheath 146 by forming a fixed suture portion 155 within the bridging strand 164.

The portion of the flexible strand that is used to form the adjustable loop 150 may be spliced through itself at a spliced section 158 to form the adjustable loop 150. The spliced section 158 may include a locking mechanism 160 (e.g., a finger trap mechanism) that may be incorporated to establish another locking mechanism of the surgical fixation system 110. In an embodiment, the spliced section 158 may be positioned at least partially inside the bore 156 of the sheath 146. A single free braid strand 162 may extend from the spliced section 158 and may be tensioned to reduce the size of the adjustable loop 150 and to reduce the size of the adjustable loop 116.

Tensioning the free braid strand 162 may assist in deploying the sheath 146 for achieving internal bone fixation after the soft suture construct 114 has been inserted into a bone tunnel. For example, tensioning the free braid strand 162 may adjust the size of the adjustable loop 150, thereby causing the sheath 146 to bunch up and thus, collapse, expand, and/or change shape to fixate the soft suture construct 114 inside a bone tunnel.

In another embodiment, the free braid stand 162 of the adjustable loop 150 of FIG. 24 may optionally be transferred through one of the locking mechanisms 124A, 124B of the adjustable loop 116 (see FIG. 17), such as by splicing the free braid strand 162 through one of the spliced sections 122A, 122B of the adjustable loop 116. This additional splicing may improve the fixation strength and overall mechanical stabilization potential of the soft suture construct 114. After being transferred through the locking mechanism 124A or 124B, the free braid strand 162 may be passed upwardly through, in this example, the third aperture 118C of the first fixation device 112 and then beneath the fixed loop section 142 of the adjustable loop 116. The free braid strand 162 may therefore be linked to the third locking mechanism 128 for releasably holding the free braid strand 162 in tension against the type of movement that is necessary for constricting the size of the adjustable loop 150 and the adjustable loop 116.

Figure 25:
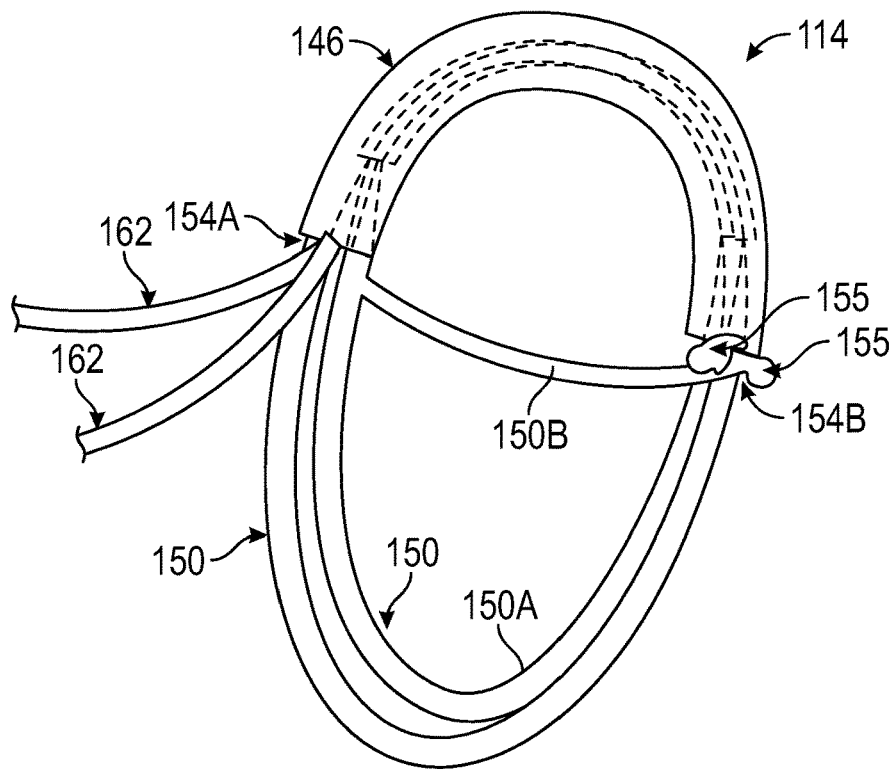
FIG. 25 illustrates yet another exemplary soft suture construct that can be used with the surgical fixation system of FIG. 16.

Another exemplary soft suture construct 114 is illustrated in FIG. 25. In this embodiment, the soft suture construct 114 may include a sheath 146 and both the adjustable loop 150 of FIG. 22 and the adjustable loop 150 of FIG. 23. Thus, the soft suture construct 114 may include two or more separate adjustable loops 150, with each adjustable loop 150 including its own fixed suture portion 155 and free braid strand 162.

In an embodiment, the fixed suture portions 155 of the adjustable loops 150 are located on the same end of the sheath 146 (see end 154B of FIG. 25). In another embodiment, the fixed suture portions 155 are located on opposite ends of the sheath 146 (see FIG. 26).

In another embodiment, shown in FIG. 27, the soft suture construct 114 may additionally include one or more filaments 166 that are passed through the sheath 146 in addition to the adjustable loop 116 and the adjustable loop(s) 150. The filament(s) 166 may be suture or suture tape that are separate from the adjustable loop 116 and the adjustable loop(s) 150, for example. The filament(s) 166 may provide for additional fixation/deployment options when using the surgical fixation system 110. The additional filaments 166 may further reduce the overall stress on any single strand of the surgical fixation system, thereby improving the overall dynamic mechanical stability and achieving higher ultimate failure strengths.

FIG. 28 illustrates yet another configuration in which multiple soft suture constructs 114 may be linked together via their respective adjustable loops 150. In an embodiment, two or more of the soft suture constructs 114 may be linked together in order to provide multiple adjustable loop bridges between different anchoring fixation points.

FIG. 29 illustrates the soft suture construct 114 of the surgical fixation system 110 of FIGS. 16-17 in a deployed state inside a bone tunnel 168. After positioning the soft suture construct 114 within the bone tunnel 168, the free braid strand 162 may be tensioned to deploy the soft suture construct 114. Tensioning the free braid strand 162 causes the sheath 146 of the soft suture construct 114 to bunch up, thereby forming an anchoring cluster 170 inside the bone tunnel 168. The anchoring cluster 170 promotes fixation of the soft suture construct 114 inside the bone within which the bone tunnel 168 is formed.

FIGS. 30-35, with continued reference to FIGS. 16-29, schematically illustrate the surgical fixation system 110 being employed within an exemplary surgical method. In the illustrated embodiment, the surgical method is a tri-cortical syndesmosis repair method that involves a human ankle. Of course, the surgical fixation systems 110 of this disclosure could be employed in other surgical methods.

FIGS. 30-35 illustrate, in sequential order, an exemplary embodiment for performing a knotless surgical method. Fewer or additional steps than are recited below could be performed within the scope of this disclosure. In addition, the recited order of steps shown in FIGS. 30-35 is not intended to limit this disclosure.

Figure 30:
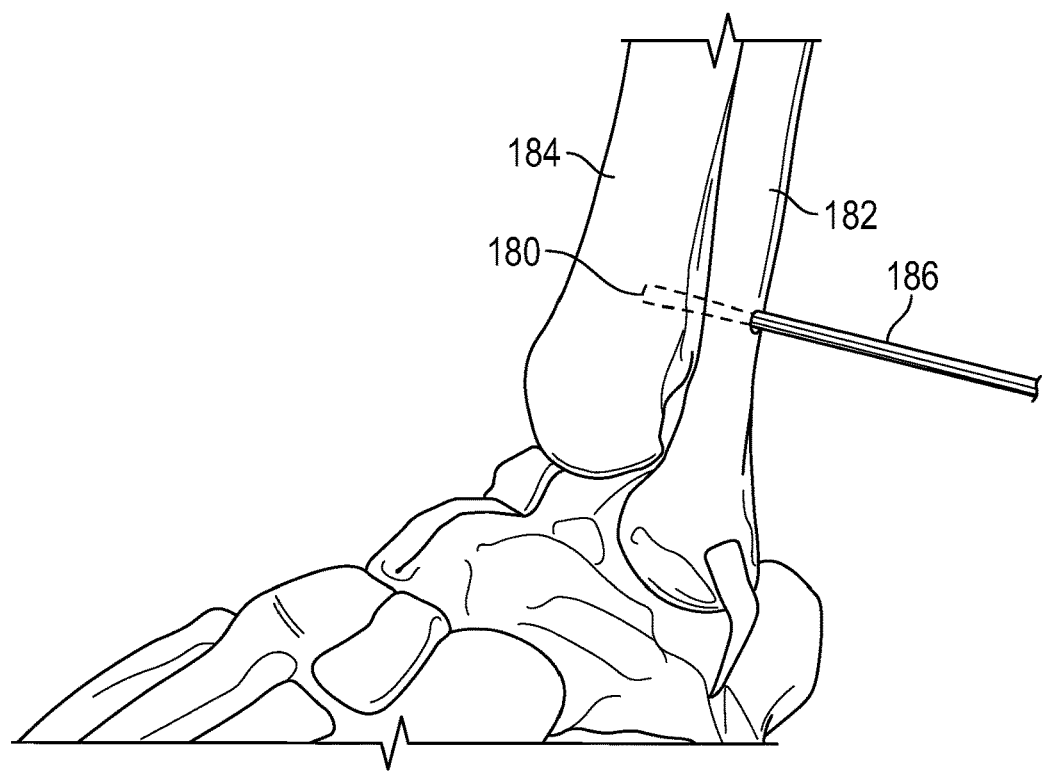
FIGS. 30, 31, 32, 33, 34, and 35 schematically illustrate an exemplary surgical method that may employ the surgical fixation system of FIG. 16.

Referring first to FIG. 30, a bone tunnel 180 may be formed through a fibula 182 (e.g., a first bone) and partially through a tibia 184 (e.g., a second bone). In an embodiment, the bone tunnel 180 is formed through two cortices (i.e., both lateral and medial) of the fibula 182 but only through a single (i.e., lateral) cortex of the tibia 184. Thus, the bone tunnel 180 passes completely through the fibula 182 but only partially through the tibia 184. The bone tunnel 180 may be drilled using any suitable drill bit 186. In an embodiment, the bone tunnel 180 is formed within each of the fibula 182 and the tibia 184 using a single drill bit and in a single surgical step.

Figure 31:
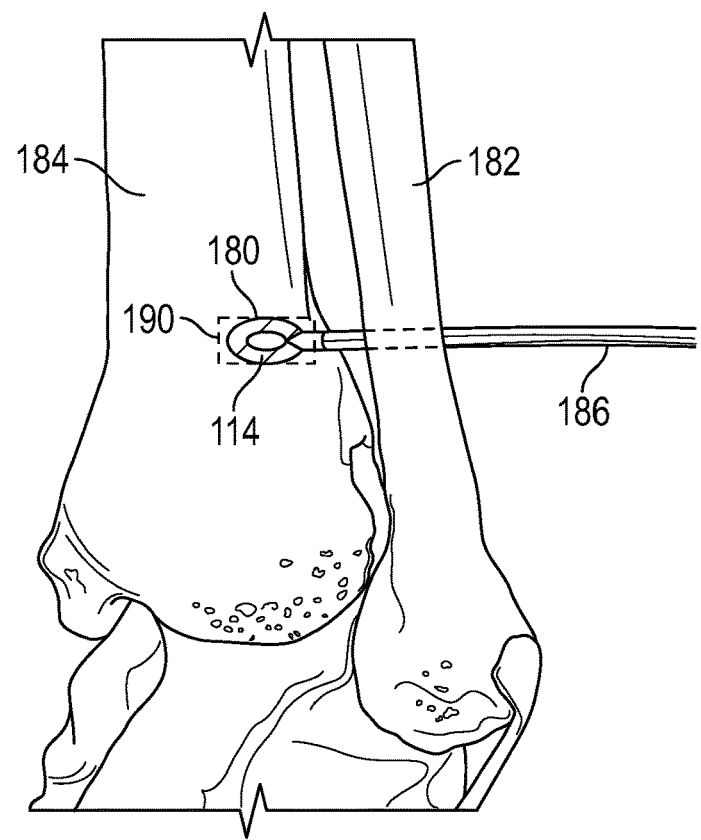
Figure 32:
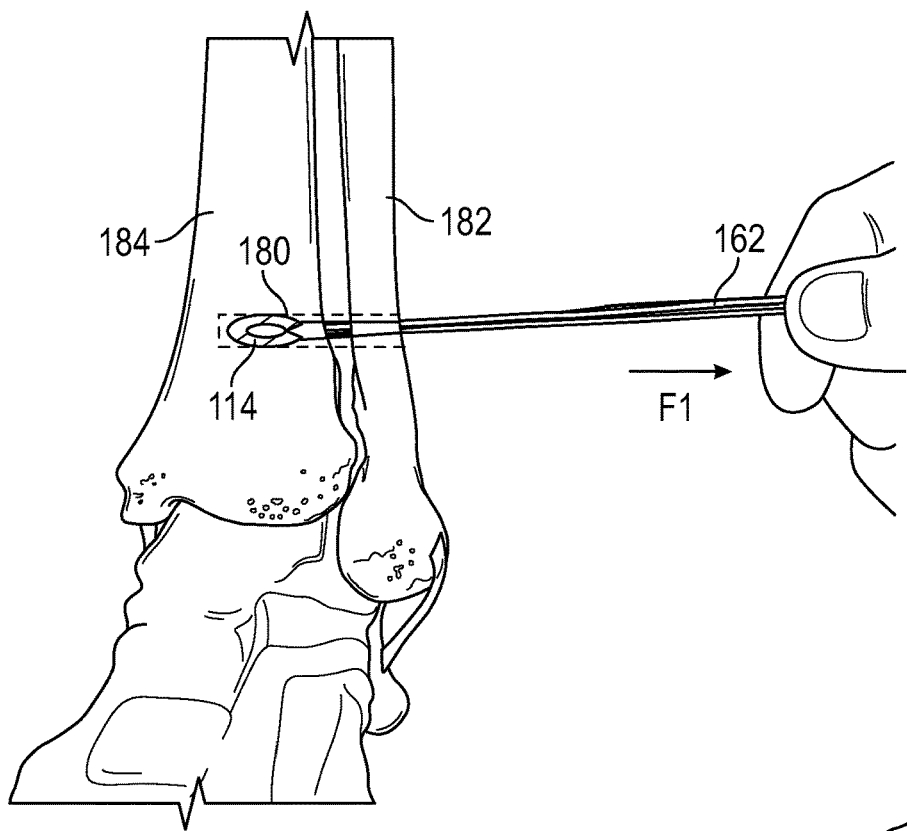

Next, as shown in FIG. 31, the soft suture construct 114 of the surgical fixation system 110 may be advanced into the bone tunnel 180. The soft suture construct 114 may be pushed horizontally through the portion of the bone tunnel 180 formed in the fibula 182 and then into the portion of the bone tunnel 180 formed in the tibia 184 using a delivery device 188. The soft suture construct 114 may be pushed until it is seated near a floor 190 of the portion of the bone tunnel 180 located inside the tibia 184.

The free braid strand 162 of the adjustable loop 150 of soft suture construct 114 may next be tensioned by applying a traction force F1 to the free braid strand 162 (see FIG. 32) in order to deploy the soft suture construct 114 and achieve internal bone fixation inside the bone tunnel 180. As discussed above, tensioning the free braid strand 162 adjusts the size of the adjustable loop 150, thereby causing the sheath 146 to bunch up and thus, collapse, expand, and/or change shape to fixate the soft suture construct 114 inside the bone tunnel 180.

Figure 33:
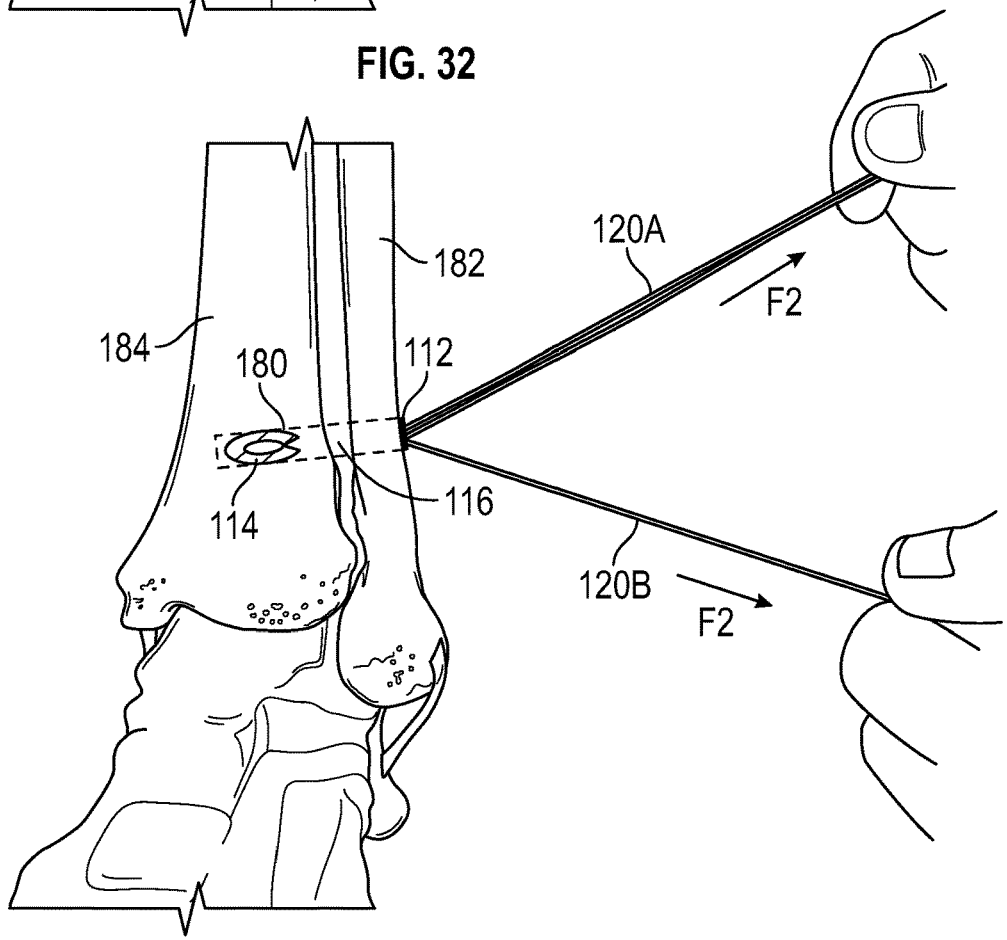

Once the soft suture construct 114 is fully deployed within the portion of the bone tunnel 180 inside the tibia 184, the first fixation device 112 may be tightened down against a lateral cortex 192 of the fibula 182 by applying a traction force F2 to the free braid strands 120A, 120B of the adjustable loop 116 (see FIG. 33). The traction force F adjusts the size of the adjustable loop 116, thereby reducing the syndesmosis of the ankle joint without the need to tie any knots.

Figure 34:
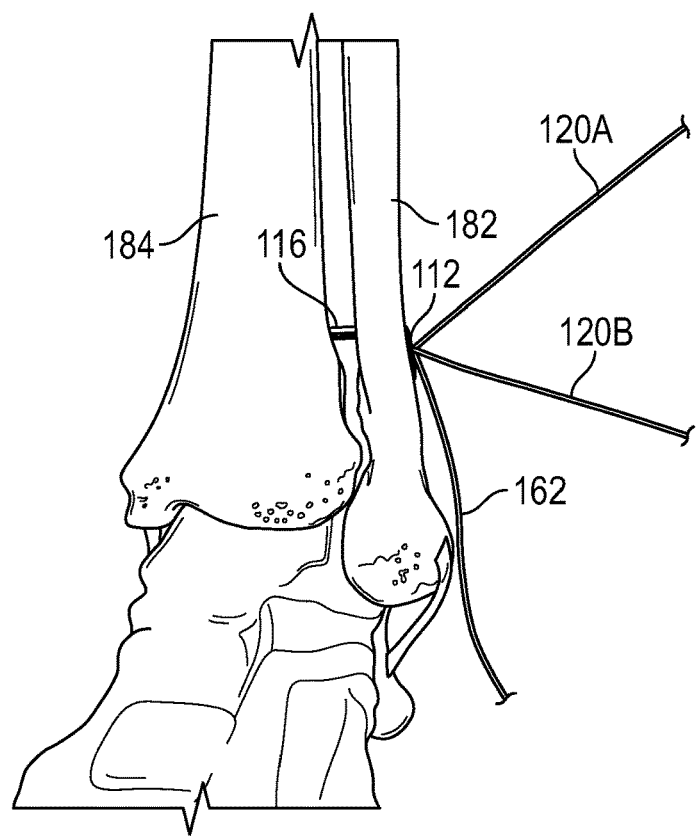
Figure 35:
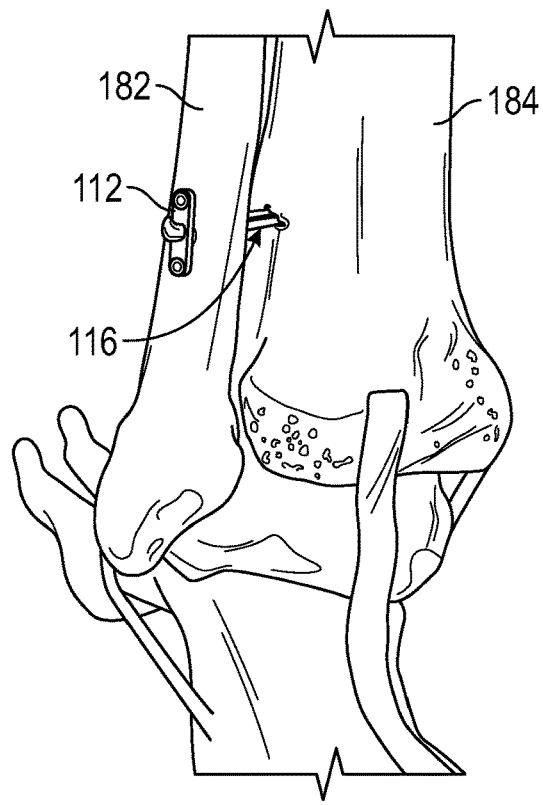

Independent tensioning adjustments may optionally be applied to the free braid strands 120A, 120B and the free braid strand 162 for optimizing the repair according to the surgeon's preference (see FIG. 34). The free braid strands 120A, 120B, and 162 may then be cut off of the surgical fixation system 110 at a location near the first fixation device 112. The completed syndesmosis repair is shown in FIG. 35.

Figure 36:
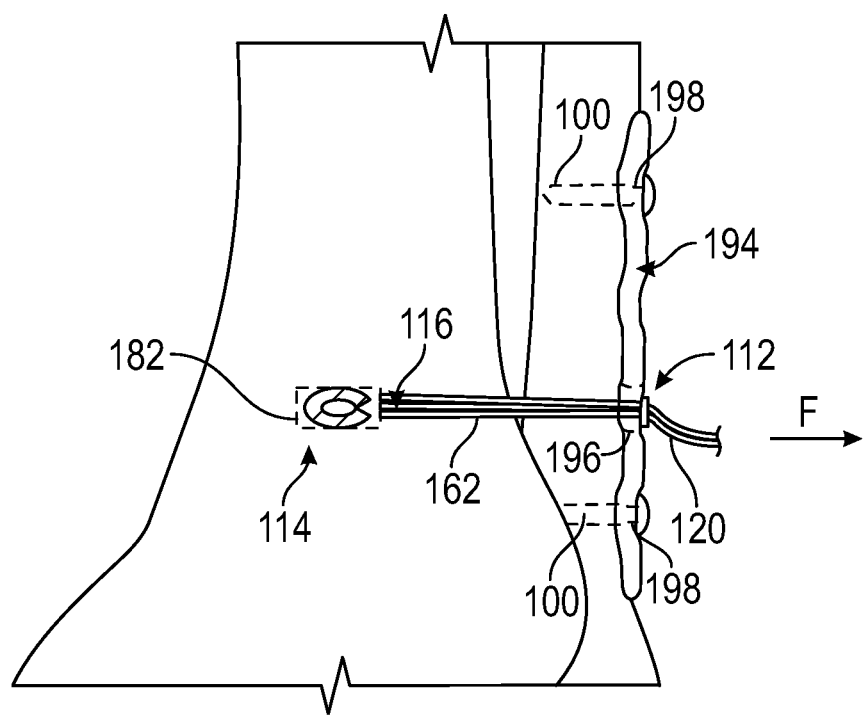
FIG. 36 schematically illustrates another exemplary surgical method.

Referring to FIG. 36, a bone plate 194 may be utilized as another component of the surgical fixation system 110 for performing the exemplary syndesmosis repair method. In an embodiment, the bone plate 194 is utilized for performing a syndesmosis reduction in association with a fracture fixation, such as when the fibula 182 is fractured.

The bone plate 194 may be contoured for receipt against the lateral cortex 192 of the fibula 182. The bone plate 194 may include at least one hole 196 for receiving the first fixation device 112 of the surgical fixation system 110 and at least one hole 198 for accepting a threaded fastener 100. In an embodiment, the threaded fastener 100 is a non-locking screw configured to fixate the bone plate 194 to the fibula 182.

In another embodiment, the bone plate 194 includes at least two holes 196 and at least two holes 198. In such an embodiment, the holes 196 are located axially between the holes 198. The total number of holes 196, 198 formed through the bone plate 194 is not intended to limit this disclosure.

Figure 37:
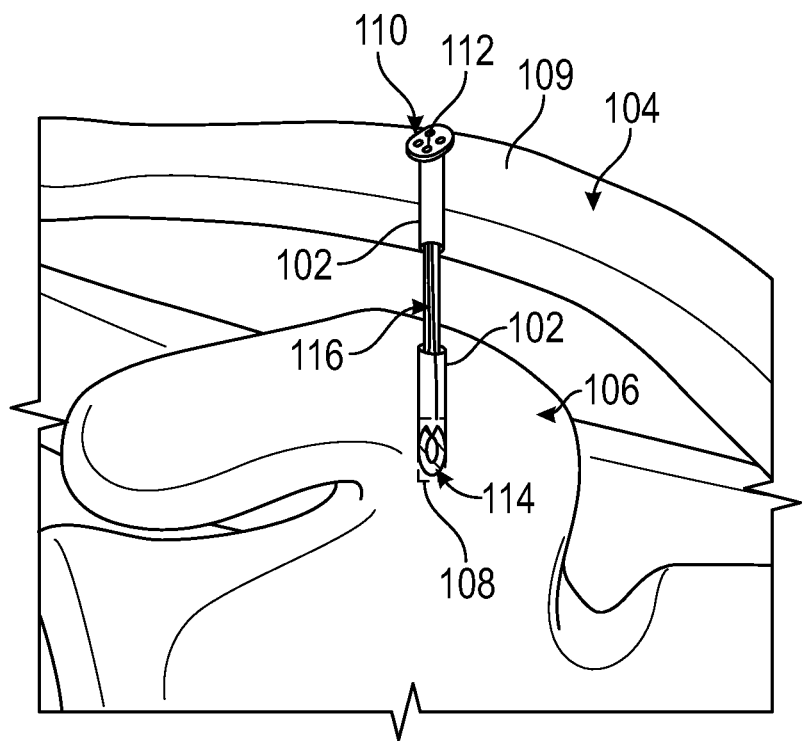
FIG. 37 schematically illustrates yet another exemplary surgical method.

FIG. 37 schematically illustrates another exemplary surgical method. In this embodiment, the surgical method is an acromioclavicular (AC) joint repair method.

A bone tunnel 102 may be prepared through a clavicle 104 and at least partially into a coracoid process 106 of the scapula. The soft suture construct 114 of the surgical fixation system 110 may be advanced into the bone tunnel 102. The soft suture construct 114 may be pushed longitudinally through the portion of the bone tunnel 102 formed in the clavicle 104 and then into the portion of the bone tunnel 102 formed in the coracoid process 106. The soft suture construct 114 may be pushed until it is seated near a floor 108 of the bone tunnel 102.

The free braid strand 162 of the adjustable loop 150 of soft suture construct 114 may next be tensioned by applying a traction force to the free braid strand 162 in order to deploy the soft suture construct 114 and achieve internal bone fixation inside the bone tunnel 102. Once the soft suture construct 114 is fully deployed within the portion of the bone tunnel 102 inside the coracoid process 106, the first fixation device 112 may be tightened down against a superior surface 109 of the clavicle 104 by applying a traction force to the free braid strands 120A, 120B of the adjustable loop 116. The traction force adjusts the size of the adjustable loop 116, thereby reducing the interval between the clavicle 104 and the coracoid process 106.

FIGS. 38 and 39 illustrate yet another exemplary surgical fixation system 210. The surgical fixation system 210 may be used to perform a variety of surgical methods. The surgical methods could include any procedure that involves repairing torn tissue or realigning bones, for example. The surgical fixation system 210 could be used in any surgical method related to the ankle, foot, hand, shoulder, or knee. ACL and PCL repairs and reconstructions are non-limiting examples of the types of surgical methods that could specifically benefit from the surgical fixation system 210. In an embodiment, the surgical fixation system 210 is used to perform "knotless" surgical methods that can be performed without requiring the surgeon to tie knots in the various flexible materials or sutures that are utilized during the surgical method. However, the surgeon could still tie knots if desired.

The surgical fixation system 210 may include, in an embodiment, a first fixation device 212 and an adjustable loop 216 connected to the first fixation device 212. Although pictured together with the first fixation device 212 in FIGS. 38-39, the adjustable loop 216, or any of the other exemplary adjustable loops described in this disclosure, could be used alone to conduct knotless surgical methods within the scope of this disclosure.

The first fixation device 212 may provide cortical bone fixation relative to a first bone after the adjustable loop 216 of the surgical fixation system 210 has been positioned within a bone tunnel, such as a femoral or tibial bone tunnel, for example. In an embodiment, the first fixation device 212 is a button. However, fixation devices having various other configurations could alternatively be used. The first fixation device 212 may be oblong or round and may be made of either metallic or polymeric materials.

In an embodiment, the first fixation device 212 includes one or more apertures 218 formed through a body of the first fixation device 212. The apertures 218 may be configured and arranged to receive the adjustable loop 216. Some of the apertures 218 could optionally carry one or more additional filaments for manipulating or maneuvering the first fixation device 212 or for augmenting fixation during a surgical method. For example, a passing filament 248 could be threaded through one of the apertures 218 and carried by the first fixation device 212 in addition to the adjustable loop 216. Moreover, although not shown in this embodiment, additional fixation devices could optionally be connected to the adjustable loop 216.

In an embodiment, the adjustable loop 216 is made of a flexible material and may include an adjustable length and/or perimeter. The adjustable loop 216 may include a first free braid strand 220A and a second free braid strand 220B. The first and second free braid strands 220A, 220B may be pulled to reduce the size of the adjustable loop 216. In an embodiment, the first free braid strand 220A extends from a first spliced section 222A of the adjustable loop 216, and the second free braid strand 220B extends from a second spliced section 222B of the adjustable loop 216. The first spliced section 222A may include a first locking mechanism 224A and the second spliced section 222B may include a second locking mechanism 224B. The first and second locking mechanisms 224A, 224B prevent the unintentional loosening of the first and second free braid strands 220A, 220B.

The adjustable loop 216 may additionally include two adjustable eyesplice loops 226A, 226B (best shown in FIG. 39). The two adjustable eyesplice loops 226A, 226B may be interlinked at an interconnection 235. The two adjustable eyesplice loops 226A, 226B may be formed by splicing the flexible material forming the adjustable loop 216 through itself (i.e., through each of the spliced sections 222A, 222B). In this embodiment, two strands extend from each of the spliced sections 222A, 222B to form each of the adjustable eyesplice loops 226A, 226B. The adjustable loop 216 is therefore considered a four-stranded loop. However, the adjustable loop 216 could be configured in various other configurations, including but not limited to a two-stranded configuration similar to the adjustable loop of FIG. 1, a six-stranded configuration similar to the adjustable loop of FIG. 7, or any other configuration.

The adjustable loop 216 may be connected to the first fixation device 212 prior to completely forming the adjustable loop 216. The first and second free braid strands 220A, 220B may be pulled to constrict the size of the adjustable eyesplice loops 226A, 226B and thus change the overall size of the adjustable loop 216.

The adjustable loop 216 may further include one or more transition areas 281 where the flexible material of the adjustable loop 216 transitions between a flat section 283 and a round (i.e., tubular) section 285. The adjustable loop 216 may therefore be referred to as a flat-to-round adjustable loop construct that has a flat-to-round configuration.

In an embodiment, the first and second free braid strands 220A, 220B and the adjustable eyesplice loops 226A, 226B establish the flat sections 283 of the adjustable loop 216, and the first and second spliced sections 222A, 222B establish the round sections 285 of the adjustable loop 216. The flat-to-round configuration of the adjustable loop 216 may provide numerous benefits and advantages. For example, the relatively broad flat sections 283 of the adjustable eyesplice loops 226A, 226B provide increased surface area for receiving a graft and are "softer" on the graft once it is looped over the interconnection 235. In addition, the relatively broad flat sections 285 of the first and second free braid strands 220A, 220B provide increased surface area for gripping and are generally less abrasive than traditional suture when gripped by a surgeon or other surgical staff members. Furthermore, the flat sections 285 of the first and second free braid strands 220A, 220B are more easily accommodated within the tubular cross-section of the round sections 285 of the first and second spliced sections 222A, 222B, thereby simplifying the splicing process and the overall usage of the adjustable loop 216.

FIG. 40 illustrates an exemplary flexible strand 287 that can be used to form the adjustable loop 216, or any of the other adjustable loops described herein. The flexible strand 287 may a filament, such as a suture or any other soft, flexible strand of material, that includes both flat sections 289 and one or more round sections 291. Both the flat sections 289 and the round sections 291 may be braided, in an embodiment. The flat sections 289 may resemble the shape and configuration of a flat suture tape, and the round sections 291 may resemble the shape and configuration of a cored or coreless tubular suture. Once the desired splicing operations are performed on the flexible strand 287, the flat sections 289 establish the flat sections 283 of the adjustable loop 216, and the round sections 291 establish the round sections 285 of the adjustable loop 216. The flat sections 289 may be routed through preformed openings formed in the round sections 291 or between individual braids of the round sections 291 during the splicing operations.

In an embodiment, the round section 291 is a mid-section of the flexible strand 287 that is disposed between two flat sections 289 (see FIG. 40). In another embodiment, the flexible strand 287 alternates between flat sections 289 and round sections 291 across its entire length (see FIG. 41). The total number of flat sections 289 and round sections 291 provided within the flexible strand 287 can vary depending on the design of the adjustable loop 216. Accordingly, other configurations for the flexible strand 287 are further contemplated within the scope of this disclosure. In addition, the flexible strands 287 of FIGS. 40 and 41 are not drawn to scale, and therefore the relative proportions between the flat sections 289 and the round sections 291 are not intended to limit this disclosure.

Figure 42:
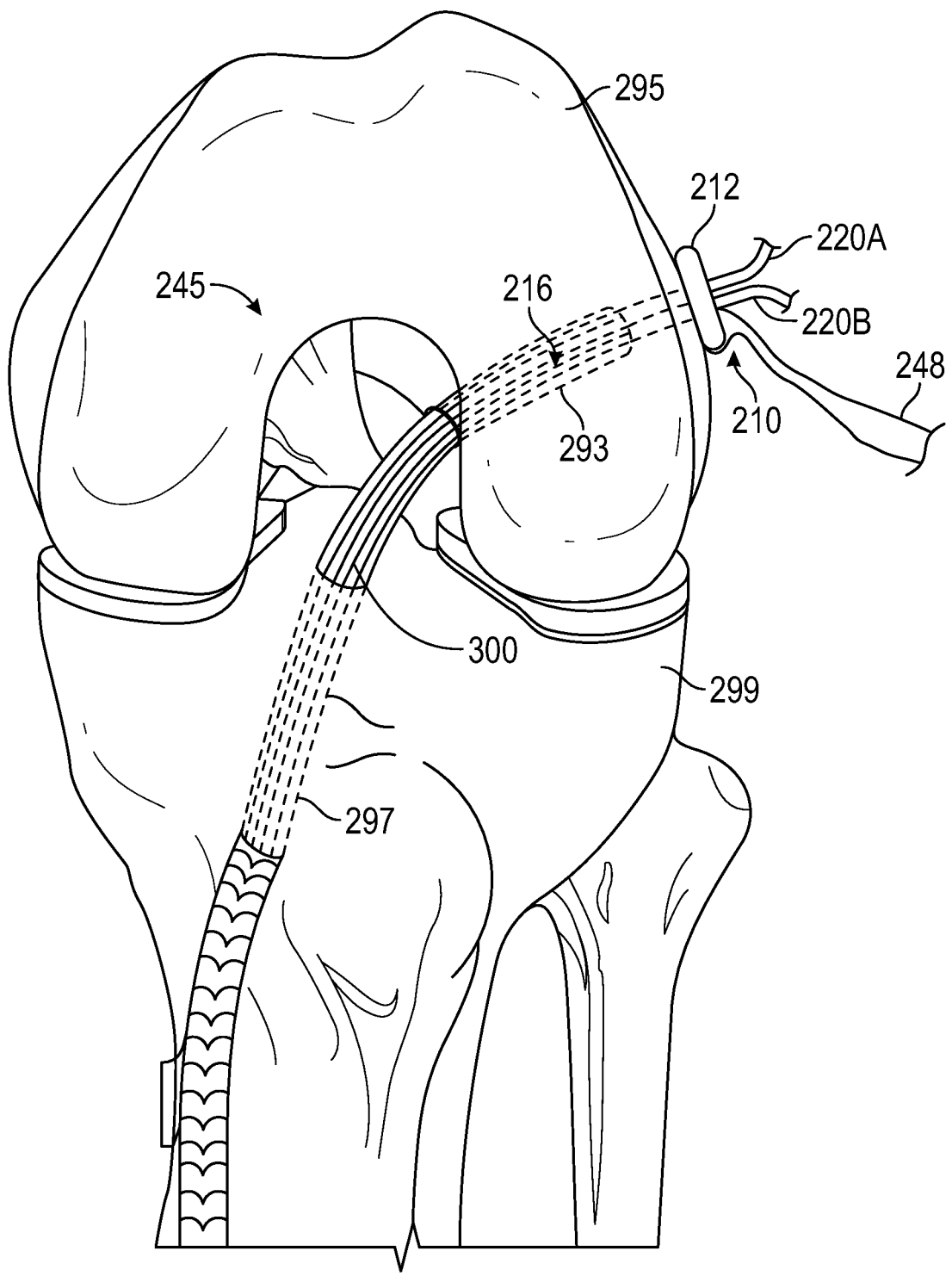
FIG. 42 schematically illustrates an exemplary surgical method that may employ the surgical fixation system of FIG. 38.

FIG. 42, with continued reference to FIGS. 38-41, schematically illustrates the surgical fixation system 210 being employed within an exemplary surgical method. In the illustrated embodiment, the surgical method is an ACL reconstruction method that involves a human knee. However, it should be understood that this disclosure is not limited to ACL reconstruction procedures, and the surgical fixation system 210 could be used in a variety of repair and/or reconstruction methods within the scope of this disclosure.

The surgical fixation system 210 may be implanted within a joint 245 (e.g., a knee joint) to repair a torn tissue (e.g., a torn ACL). Prior to positioning the surgical fixation system 210 within the joint 245, a first bone tunnel 293 (e.g., a socket or passage) is formed in a first bone 295 (e.g., a femur) and a second bone tunnel 297 (e.g., a socket or passage) is formed in a second bone 299 (e.g., a tibia). The first bone tunnel 293 and the second bone tunnel 297 may be formed using known drilling techniques to establish voids within the first and second bones 295, 299 for accommodating the surgical fixation system 210.

In an exemplary embodiment, the surgical fixation system 210 is implanted by passing the fixation device 212 through the first bone tunnel 293 and the second bone tunnel 297. The fixation device 212 may be pulled through the first and second bone tunnels 293, 297 using the passing filament 248 and is configured to self-flip onto the cortex of the first bone 295 once tension is released on the passing filament 248.

After passing and flipping the fixation device 212, the adjustable loop 216 is positioned within the first bone tunnel 293. The free braid strands 220A, 220B may be pulled to adjust the size of the adjustable loop 216 and to aid the positioning of a graft 300 within the first bone tunnel 293. The adjustable loop 216 may suspend the graft 300 within portions of the first bone tunnel 293 and the second bone tunnel 297. The graft 300 could be a soft tissue graft, a bone-tendon-bone (BTB) graft, or any other suitable graft.

Fixation of the graft 300 relative to the second bone 299 can be achieved in a variety of ways. For example, the graft 300 may be fixated within the second bone tunnel 297 using an additional fixation device, such as an interference screw, a suture anchor, or a button.

The surgical fixation systems of this disclosure provide knotless, adjustable suture loop-based arthroscopic soft tissue repair devices and associated methods for performing joint stabilizations, tissue repairs, tissue reconstructions, and other similar surgical methods. In some embodiments, the exemplary surgical fixation systems provide a combination of two or more locking mechanisms for increasing fixation strength. Improved construct stability permits a reduction in the number of loaded strands (e.g., 2-stranded loop design) in order to achieve similar strength compared to isolated button or suture locked constructs that require multiple loop strands. The reduced suture loop material of the 2-stranded loop embodiment may also reduce bony tunnel diameters, thereby reducing the risk of repair/reconstruction induced tissue (e.g. bone) fractures/failure.

In other embodiments, the exemplary surgical fixations systems may provide for repair/reconstruction optimizations by providing the ability to retension the adjustable loop after implantation. The retensioning function provides for a more flexible intraoperative handling option for a surgeon after primary fixation, which is beneficial compared to final fixations achieved via knot tying. Single loop tensioning and equal distribution of loads within the adjustable suture loop construct reduces the risk of overloading the suture loop.

In other embodiments, the exemplary surgical fixation systems may include at least two adjustable length loops with separate locking mechanisms for achieving independent soft suture construct deployment and tissue repair/reconstruction. The separate locking mechanisms of the proposed surgical fixation system designs allow for maintaining tension in the adjustable loop constructs, thereby improving pull out strength of the soft suture constructs. In addition, improved soft suture construct internal bone fixation and overall mechanically stabilization can be achieved by transferring the free braid strand of the adjustable loop of the soft suture construct through the locking mechanism of the independent repair/reconstruction adjustable loop.

In other embodiments, the exemplary surgical fixation systems may employ flat-to-round adjustable loop constructs. The flat-to-round configuration of the adjustable loops provides for increased strength, increased graft receiving surface area, and increased surface area for improved gripping of the loop shortening strands.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A surgical fixation system, comprising:
   a first fixation device;
   an adjustable loop connected to the first fixation device;
   a free braid strand configured to adjust a size of the adjustable loop;
   a first locking mechanism established by a spliced section of the adjustable loop;
   a second locking mechanism that is independent from the first locking mechanism,
   wherein the second locking mechanism is established by a combination of features of the first fixation device and the adjustable loop,
   wherein the free braid strand passes from the spliced section, through a suture return aperture of the first fixation device, and then beneath a fixed loop section of the adjustable loop that rests over top of a bridge of the first fixation device to establish the second locking mechanism; and
   a filament separate from the adjustable loop that extends between the fixed loop section of the adjustable loop and the first fixation device, and wherein the filament is tensionable to move the fixed loop section, thereby releasing the free braid strand for adjusting the size of the adjustable loop.

2. The system as recited in claim 1, wherein the first fixation device is a first button, and comprising a second fixation device connected to the adjustable loop and configured as a second button.

3. The system as recited in claim 2, wherein the first button includes a first aperture, a second aperture, and the bridge of the first button is disposed between the first aperture and the second aperture to establish the second locking mechanism, and further wherein, in a locked position of the second locking mechanism, the free braid strand is tensioned against an outer surface of the bridge by the fixed loop section.

4. The system as recited in claim 3, wherein the first aperture, the second aperture, and the suture return aperture are each oval shaped openings.

5. The system as recited in claim 3, comprising a suture tape received through the first aperture and the second aperture.

6. The system as recited in claim 2, wherein the first button is a round button, and the second button is an elongated button.

7. The system as recited in claim 2, comprising a needle connected to the second button by a passing filament and configured to pull the second button through a bone tunnel.

8. The system as recited in claim 2, comprising a delivery device configured to push the second button through a bone tunnel, wherein the delivery device includes a handle and a shaft extending from the handle.

9. The system as recited in claim 1, wherein the first fixation device is a button, and comprising a second fixation device connected to the adjustable loop and configured as a screw or a suture anchor.

10. The system as recited in claim 1, wherein the first locking mechanism is a finger trap mechanism of the adjustable loop.

11. The system as recited in claim 1, wherein the adjustable loop comprises:
    the spliced section;
    the free braid strand extending from the spliced section;
    the first locking mechanism;
    a single adjustable eyesplice loop extending in a first direction from the spliced section; and
    the fixed loop section extending in a second direction from the spliced section.

12. The system as recited in claim 1, wherein the adjustable loop includes a flat-to-round configuration.

13. The system as recited in claim 1, wherein an outer surface of the bridge is flush with a top surface of the first fixation device.

14. The system as recited in claim 13, wherein the bridge includes a pair of angled surfaces that diverge from one another in a direction toward a bottom surface of the first fixation device.

15. The system as recited in claim 1, wherein the free braid strand is a single free braid strand of the surgical fixation system.

16. The system as recited in claim 1, wherein the filament is passed beneath the fixed loop section of the adjustable loop.

17. The system as recited in claim 16, wherein the filament is tensionable to pull the fixed loop section away from the bridge and thereby permit the free braid strand to be tensioned for adjusting the size of the adjustable loop.

18. A surgical fixation system, comprising:
    a first fixation device, wherein the first fixation device is a first button;
    an adjustable loop connected to the first fixation device;
    a free braid strand configured to adjust a size of the adjustable loop;
    a first locking mechanism established by a spliced section of the adjustable loop;
    a second locking mechanism that is independent from the first locking mechanism, wherein the second locking mechanism is established by a combination of features of the first fixation device and the adjustable loop, wherein the free braid strand passes from the spliced section, through a suture return aperture of the first fixation device, and then beneath a fixed loop section of the adjustable loop that rests over top of a bridge of the first fixation device to establish the second locking mechanism;

a second fixation device connected to the adjustable loop and configured as a second button; and a delivery device configured to push the second button through a bone tunnel, wherein the delivery device includes a handle and a shaft extending from the handle, wherein the first button is releasably held within a slot of the handle, and the second button is releasably held at an end of the shaft.

* * * * *